(12) United States Patent
Tsubone

(10) Patent No.: US 10,754,606 B2
(45) Date of Patent: Aug. 25, 2020

(54) IMAGE PROCESSING APPARATUS AND IMAGE PROCESSING SYSTEM

(71) Applicant: RICOH COMPANY, LTD., Tokyo (JP)

(72) Inventor: Shuhei Tsubone, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 505 days.

(21) Appl. No.: 15/274,263

(22) Filed: Sep. 23, 2016

(65) Prior Publication Data

US 2017/0109121 A1 Apr. 20, 2017

(30) Foreign Application Priority Data

Oct. 14, 2015 (JP) .................................. 2015-202516

(51) Int. Cl.
| | |
|---|---|
| *G06F 3/048* | (2013.01) |
| *G06F 3/14* | (2006.01) |
| *G06F 3/0482* | (2013.01) |
| *G06F 3/041* | (2006.01) |
| *G06F 3/044* | (2006.01) |
| *G06F 3/0484* | (2013.01) |
| *G06F 3/0488* | (2013.01) |
| *G06T 11/20* | (2006.01) |
| *H04L 29/08* | (2006.01) |

(52) U.S. Cl.
CPC ............ *G06F 3/1454* (2013.01); *G06F 3/044* (2013.01); *G06F 3/0412* (2013.01); *G06F 3/0482* (2013.01); *G06F 3/04842* (2013.01); *G06F 3/04845* (2013.01); *G06F 3/04883* (2013.01); *G06T 11/203* (2013.01); *G06F 2203/04106* (2013.01); *G09G 2360/04* (2013.01); *G09G 2370/022* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 5,608,426 A | 3/1997 | Hester | |
| 2003/0053084 A1* | 3/2003 | Geidl | G06F 17/24 358/1.6 |
| 2004/0119762 A1 | 6/2004 | Denoue et al. | |
| 2004/0174399 A1 | 9/2004 | Wu et al. | |

(Continued)

FOREIGN PATENT DOCUMENTS

| | | |
|---|---|---|
| CN | 102096548 A | 6/2011 |
| CN | 103004187 A | 3/2013 |

(Continued)

OTHER PUBLICATIONS

Extended European Search Report dated Feb. 1, 2017 in Patent Application No. 16193245.4.

(Continued)

*Primary Examiner* — William C Trapanese
(74) *Attorney, Agent, or Firm* — Xsensus LLP

(57) ABSTRACT

An image processing apparatus includes a display to display an image, and circuitry to generate a duplication of the image displayed on the display when the image displayed on the display is selected, and display the generated duplication of the image on the display.

20 Claims, 22 Drawing Sheets

(56) References Cited

U.S. PATENT DOCUMENTS

| | | | |
|---|---|---|---|
| 2004/0221043 A1* | 11/2004 | Su | H04L 12/18 709/227 |
| 2005/0091603 A1* | 4/2005 | Chen | G06F 9/543 715/769 |
| 2006/0200780 A1* | 9/2006 | Iwema | G06F 3/0488 715/810 |
| 2006/0288218 A1 | 12/2006 | Kotipalli | |
| 2007/0263082 A1 | 11/2007 | Tamaru et al. | |
| 2007/0264082 A1 | 11/2007 | Burnes | |
| 2011/0141043 A1* | 6/2011 | Soubrie | G06F 3/04883 345/173 |
| 2011/0185300 A1* | 7/2011 | Hinckley | G06F 3/03545 715/769 |
| 2013/0063547 A1 | 3/2013 | Kasuya et al. | |
| 2014/0160153 A1* | 6/2014 | Singh | G06Q 10/101 345/629 |
| 2014/0162239 A1* | 6/2014 | Roach | G09B 5/125 434/350 |
| 2014/0380193 A1* | 12/2014 | Coplen | G06F 3/04847 715/753 |
| 2015/0058735 A1 | 2/2015 | Nagase et al. | |
| 2015/0091940 A1 | 4/2015 | Emori et al. | |
| 2015/0229681 A1 | 8/2015 | Tsubone et al. | |
| 2015/0334350 A1 | 11/2015 | Tamura et al. | |
| 2016/0036871 A1 | 2/2016 | Tsubone et al. | |

FOREIGN PATENT DOCUMENTS

| | | |
|---|---|---|
| CN | 104247408 A | 12/2014 |
| JP | 2014-149579 A | 8/2014 |
| JP | 2015-069284 | 4/2015 |

OTHER PUBLICATIONS

Office Action dated Nov. 18, 2019, issued in Chinese Patent Application No. 201610899268.2, 7 pages.

* cited by examiner

| PAGE DATA ID | START TIME POINT | END TIME POINT | STROKE ARRANGEMENT DATA ID | MEDIA DATA ID |
|---|---|---|---|---|
| p001 | 20130610102423 | 20130610102802 | st001 | m001 |
| p002 | 20130610102815 | 20130610103225 | st002 | m002 |
| p003 | 20130610103545 | 20130610104233 | st003 | m003 |
| ⋮ | ⋮ | ⋮ | ⋮ | ⋮ |

FIG. 20

| STROKE DATA ID | START TIME POINT | END TIME POINT | COLOR | WIDTH | COORDINATE ARRANGEMENT DATA ID |
|---|---|---|---|---|---|
| s001 | 20130610102502 | 20130610102505 | ff0000 | 2 | c001 |
| s002 | 20130610102612 | 20130610102615 | 000ff0 | 3 | c002 |
| s003 | 20130610102704 | 20130610102712 | 000000 | 1 | c003 |
| ...... | ...... | ...... | ...... | ...... | ...... | st001, st002, st003 ...

FIG. 21

| X COORDINATE | Y COORDINATE | TIME DIFFERENCE | POINTER PRESSURE |
|---|---|---|---|
| 10 | 10 | 100 | 255 |
| 12 | 10 | 200 | 255 |
| 14 | 12 | 300 | 255 |
| ...... | ...... | ...... | ...... | c001, c002, c003 ...

FIG. 22

| MEDIA DATA ID | DATA TYPE | RECORDING TIME POINT | X COORDINATE | Y COORDINATE | WIDTH | HEIGHT | DATA |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| ...... | ...... | ...... | ...... | ...... | ...... | ...... | ...... |

FIG. 23

| PRODUCT ID | LICENSE ID | EXPIRATION DATE |
|---|---|---|
| 1001 | 12345678abcdefgh | 2015/12/31 |
| 1002 | 4321dcba8765hgfe | 2015/12/31 |
| ...... | ...... | ...... |

FIG. 25

| NAME | MAIL ADDRESS |
|---|---|
| TARO | taro@alpha.co.jp |
| HANANKO | hanako@bete.co.jp |
| JIRO | jiro@gamma.co.jp |
| ⋮ | ⋮ |

FIG. 26

| |
|---|
| Iwb-20130610104423.pdf |
| Iwb-20130625152245.pdf |
| Iwb-20130628113418.pdf |
| ⋮ |

FIG. 27

| NAME | IP ADDRESS |
|---|---|
| ROOM 1 | 192.0.0.1 |
| ROOM 2 | 192.0.0.2 |
| ROOM 3 | 192.0.0.3 |
| ⋮ | ⋮ |

FIG. 29

| NAME | IP ADDRESS |
|---|---|
| ROOM 1 | 192.0.0.1 |
| ROOM 2 | 192.0.0.2 |
| ROOM 8 | 192.0.0.8 |
| ⋮ | ⋮ |

FIG. 30

| SEQ | OPERATION NAME | SENDER IP ADDRESS | SENDER PORT NUMBER | TRANSMISSION DESTINATION IP ADDRESS | TRANSMISSION DESTINATION PORT NUMBER | OPERATION TYPE | OPERATION TARGET | DATA |
|---|---|---|---|---|---|---|---|---|
| 1 | ADD | 192.0.0.1 | 50001 | 192.0.0.1 | 50000 | STROKE | p005 | ….(STROKE DATA) |
| 2 | ADD | 192.0.0.1 | 50000 | 192.0.0.1 | 50001 | STROKE | p005 | ….(STROKE DATA) |
| 3 | UPDATE | 192.0.0.2 | 50001 | 192.0.0.1 | 50000 | STROKE | s006 | (50, 40) |
| 4 | UPDATE | 192.0.0.1 | 50000 | 192.0.0.1 | 50001 | STROKE | s006 | (50, 40) |
| 5 | DELATE | 192.0.0.2 | 50001 | 192.0.0.1 | 50000 | STROKE | s007 | - |
| 6 | DELATE | 192.0.0.1 | 50000 | 192.0.0.1 | 50001 | STROKE | s007 | - |
| 7 | ADD | 192.0.0.1 | 50001 | 192.0.0.1 | 50000 | PAGE | - | - |
| 8 | ADD | 192.0.0.1 | 50000 | 192.0.0.1 | 50001 | PAGE | - | - |
| 9 | ADD | 192.0.0.2 | 50001 | 192.0.0.1 | 50000 | IMAGE | p006 | rico.jpg |
| 10 | ADD | 192.0.0.1 | 50000 | 192.0.0.1 | 50001 | IMAGE | p006 | rico.jpg |
| 11 | COPY | 192.0.0.1 | 50001 | 192.0.0.1 | 50000 | STROKE | s005 | ….(STROKE DATA) |
| 12 | PASTE | 192.0.0.1 | 50001 | 192.0.0.1 | 50000 | STROKE | p005 | ….(STROKE DATA) |
| 13 | PASTE | 192.0.0.1 | 50000 | 192.0.0.2 | 50001 | STROKE | p005 | ….(STROKE DATA) |
| 14 | CUT | 192.0.0.2 | 50001 | 192.0.0.1 | 50000 | STROKE | p005 | ….(STROKE DATA) |
| 15 | CUT | 192.0.0.1 | 50000 | 192.0.0.1 | 50001 | STROKE | p005 | ….(STROKE DATA) |
| …. | …. | …. | …. | …. | …. | …. | …. | …. |

IMAGE PROCESSING APPARATUS AND IMAGE PROCESSING SYSTEM

CROSS-REFERENCE TO RELATED APPLICATION

This application claims priority pursuant to 35 U.S.C. § 119(a) to Japanese Patent Application No. 2015-202516, filed on Oct. 14, 2015 in the Japan Patent Office, the disclosure of which are incorporated by reference herein in their entirety.

BACKGROUND

Technical Field

This disclosure relates to an image processing apparatus having a display, and an image processing system including the image processing apparatus.

Background Art

Electronic information boards having flat panel displays such as liquid crystal displays and a touch panel have been used for normal conferences and remote conferences. For example, JP-2015-069284-A discloses an image processing apparatus, which displays a stroke image, which is a stroke drawn by a user input operation, and a background image on a display while the stroke image is being superimposed over the background image. However, operability of the image processing apparatus may not be enough when editing the stroke image displayed on the display.

SUMMARY

As one aspect of the present invention, an image processing apparatus is devised. The image processing apparatus includes a display to display an image, and circuitry to generate a duplication of the image displayed on the display when the image displayed on the display is selected, and display the generated duplication of the image on the display.

As another aspect of the present invention, an image processing system is devised. The image processing system includes a plurality of image processing apparatuses connected with each other via a network. Each of the plurality of the image processing apparatuses includes a display to display an image, and circuitry to generate a duplication of the image displayed on the display when the image displayed on the display is selected, and display the generated duplication of the image on the display. Data of the duplication of the image is being transmittable between at least two of the plurality of image processing apparatuses via the network.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 20 is an example of stroke data;

FIG. 21 is an example of coordinate arrangement data;

FIG. 22 is an example of media data;

FIG. 23 is an example of a remote license management table;

FIG. 25 is an example of an address list management table;

FIG. 26 is an example of backup data;

FIG. 27 is an example of a connection partner management table;

FIG. 29 is an example of a participation location management table;

FIG. 30 is an example of operation data; and

Figure 1:
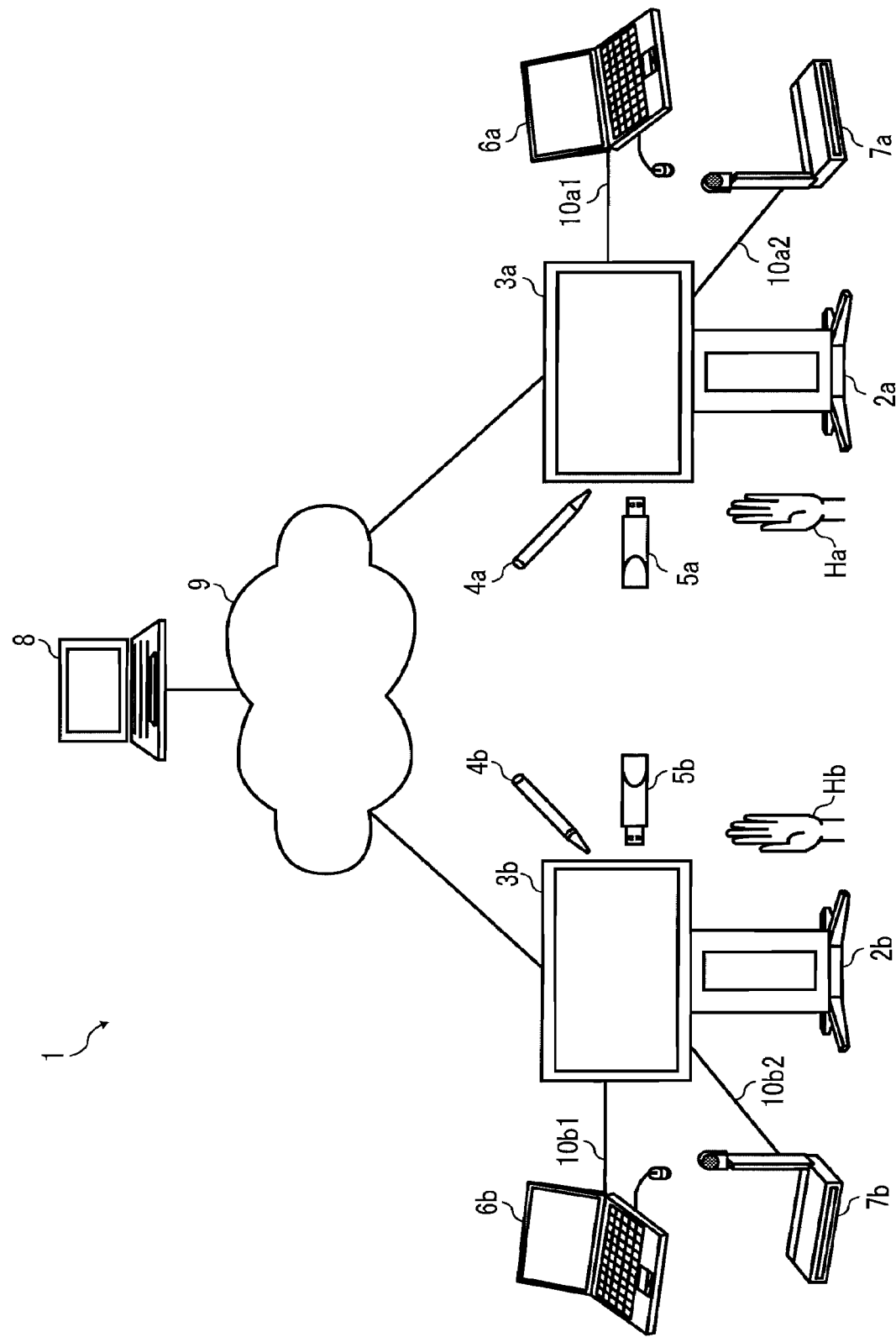
FIG. 1 illustrates a schematic diagram of an image processing system of one example embodiment of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise.

Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more example embodiments of the present invention are described hereinafter.

A description is given of an image processing system of one example embodiment of the present invention with reference to FIGS. 1 to 34. FIG. 1 illustrates a schematic diagram of an image processing system 1 of one example embodiment of the present invention.

The image processing system 1 includes, for example, a plurality of electronic information boards and a personal computer (PC) 8 that are communicably connected or coupled one to another via a communication network 9. A description is given of a case that the plurality of electronic information boards includes two electronic information boards 2a and 2b, but not limited hereto. The plurality of electronic information boards can be three or more electronic information boards. The plurality of electronic information boards are disposed at different or remote locations. Then, the PC 8 can be used to view an image that can be shared among the plurality of electronic information boards.

A first note PC 6a can be communicably connected or coupled to the first electronic information board 2a via a cable 10a1, and a first teleconference terminal 7a can be communicably connected or coupled to the first electronic information board 2a via a cable 10a2. Similarly, a second note PC 6b can be communicably connected or coupled to the second electronic information board 2b via a cable 10b1, and a second teleconference terminal 7b can be communicably connected or coupled to the second electronic information board 2b via a cable 10b2.

Each of the cables can communicate data using standards such as DisplayPort, Digital Visual Interface (DVI), High-Definition Multimedia Interface (HDMI: registered trademark), and Video Graphics Array (VGA).

Each of the note PCs and each of the teleconference terminals can be coupled to the electronic information board 2 by using wireless communication using standards such as Bluetooth (registered trademark).

The first electronic information board 2a includes, for example, a first display 3a. Similarly, the second electronic information board 2b includes, for example, a second display 3b.

Further, as to the image processing system 1, a first electronic pointer 4a and a first universal serial bus (USB) memory 5a can be set for the first electronic information board 2a, and a second electronic pointer 4b and a second universal serial bus (USB) memory 5b can be set for the second electronic information board 2b.

When a front end of the electronic pointer 4 is pressed against the display 3, the front end of the electronic pointer 4 is pushed into the electronic pointer 4 by a force of repulsion from the display 3. When the front end is pushed into the electronic pointer 4, the electronic pointer 4 reports the pushing to the corresponding electronic information board 2, in which the electronic pointer 4 communicates with the corresponding electronic information board 2 using, for example, infrared rays. In FIG. 1, a user hand on the first electronic information board 2a is indicated as a first user hand Ha, and a user hand on the second electronic information board 2b is indicated as a second user hand Hb.

At the first electronic information board 2a, an image can be drawn on the first display 3a by using the first electronic pointer 4a. Further, at the second electronic information board 2b, an image can be drawn on the second display 3b by using the second electronic pointer 4b.

Then, the image drawn on the first display 3a of the first electronic information board 2a at one site can be displayed on the second display 3b of the second electronic information board 2b at other site, and the image drawn on the second display 3b of the second electronic information board 2b at the other site can be displayed on the first display 3a of the first electronic information board 2a at the one site. Therefore, a remote-location sharing process that can share the same image at remote locations can be performed by using the image processing system 1, and thereby the image processing system 1 can be useful for a conference between several remote locations. Further, the shared image can be displayed on a display of the PC 8.

At each of the electronic information boards, a user can change an image displayed on the display by using a hand. For example, the user can change an image displayed on the display by performing a gesture of expansion, reduction, and page switching by using a hand.

Further, the first USB memory 5a can be connected to the first electronic information board 2a. The first electronic information board 2a can read out electronic files from the first USB memory 5a, and store electronic files in the first USB memory 5a.

Similarly, the second USB memory 5b can be connected to the second electronic information board 2b. The second electronic information board 2b can read out electronic files from the second USB memory 5b, and store electronic files in the second USB memory 5b.

Since the first electronic information board 2a and the second electronic information board 2b have the same configuration and capabilities, the first electronic information board 2a and the second electronic information board 2b may be simply referred to the "electronic information board 2," as required Hereinafter, the display of the electronic information board 2 may be simply referred to the "display 3," the electronic pointer may be simply referred to the "electronic pointer 4," the USB memory may be simply referred to the "USB memory 5," the note PC may be simply referred to the "note PC 6," the teleconference terminal may be simply referred to the "teleconference terminal 7," the hand may be simply referred to the "hand H," and the cable may be simply referred to the "cable 10."

Figure 2:
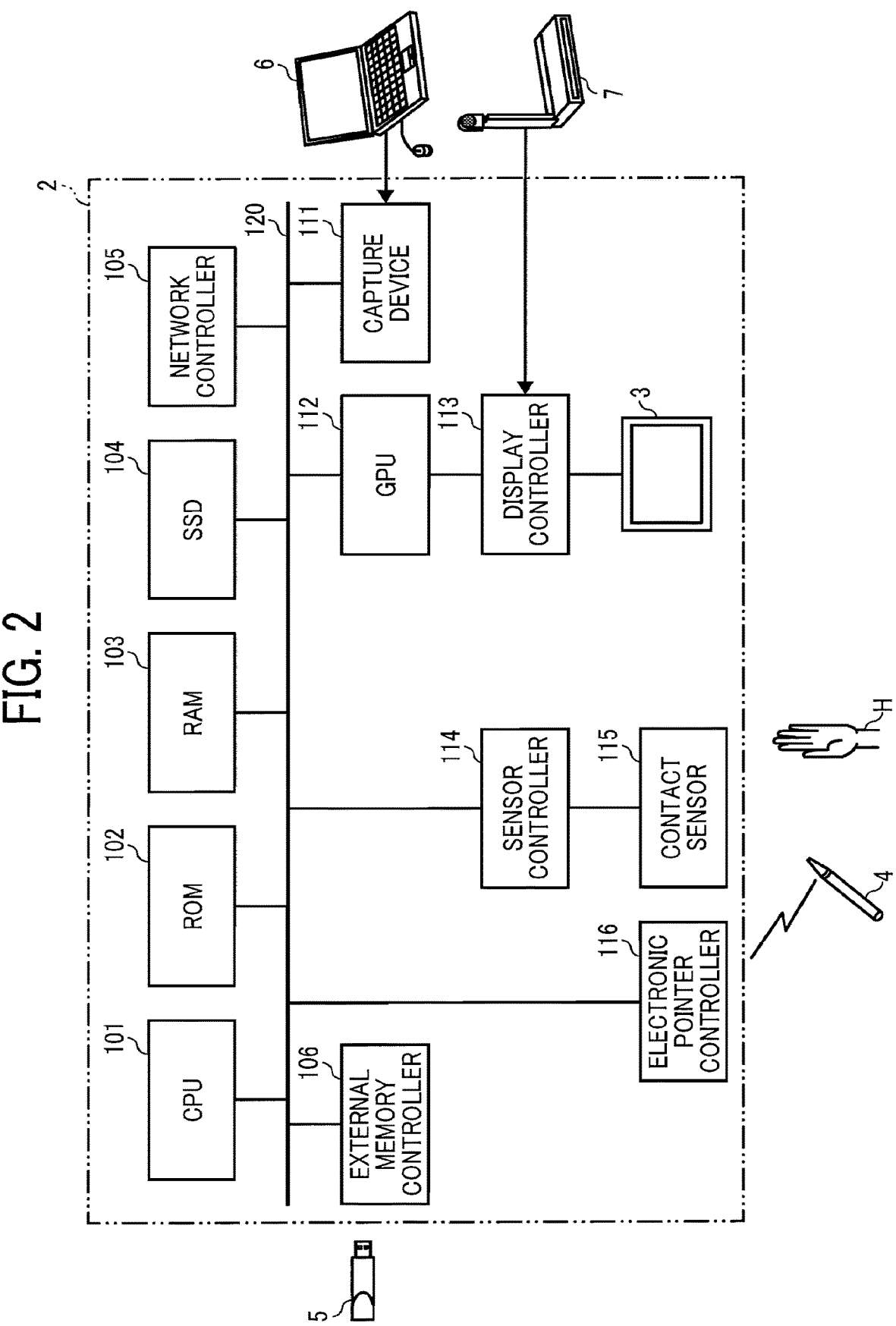
FIG. 2 illustrates a hardware configuration of an electronic information board.

A description is given of an example of a hardware configuration of the electronic information board 2 with reference to FIG. 2.

The electronic information board 2 includes, for example, the display 3, a central processing unit (CPU) 101, a read only memory (ROM) 102, a random access memory (RAM) 103, a solid state drive (SSD) 104, a network controller 105, an external memory controller 106, a capture device 111, a graphics processing unit (GPU) 112, a display controller 113, a sensor controller 114, a contact sensor 115, and an electronic pointer controller 116. Further, the contact sensor 115 can be integrated into the display 3.

The CPU 101 executes programs stored in the SSD 104 to control the entire operation of the electronic information board 2. The ROM 102 is a memory that stores a plurality of programs and various data. Among the plurality of programs and various data, programs executed by the CPU 101 and data used for the programs can be loaded to the SSD 104 from the ROM 102 when the CPU 101 executes the programs. The RAM 103 is used as a working memory.

The network controller 105 of one electronic information board controls communication with other electronic information boards via the communication network 9. The external memory controller 106 controls communication with the USB memory 5. The capture device 111 acquires image information displayed on a display of the note PC 6 as still image or movie image. The GPU 112 performs data processing for graphics.

The display controller 113 performs control and management of a display screen of the display 3. The display controller 113 displays an image output from the GPU 112, and an image output from the teleconference terminal 7 on the display 3.

The contact sensor 115 can be an infrared-cut-detectable touch panel. The contact sensor 115 detects a contact of the electronic pointer 4 or user hand H on the display 3. Further, the contact sensor 115 detects information of the contact position or point on the display 3. As to the infrared-cut-detectable touch panel, two light emission/reception devices set at the upper end corners of the display 3 emit a plurality of infrared rays parallel to the display 3. The infrared rays are reflected at reflectors disposed at periphery of the display 3, and then the reflected infrared rays are received by the two light emission/reception devices.

The contact sensor 115 outputs identification (ID) of infrared rays blocked by the electronic pointer 4 or the user hand H contacting the display 3 to the sensor controller 114 as information of the contact position or point. Then, the sensor controller 114 identifies coordinates of the contact position or point of the electronic pointer 4 or the user hand H based on the information of the contact position or point received from the contact sensor 115.

Further, the contact sensor 115 is not limited to the infrared-cut-detectable touch panel. For example, the contact sensor 115 can be a capacitance touch panel that identifies the contact position or point by detecting a change of capacitance, the contact sensor 115 can be a resistive membrane system touch panel that identifies the contact position or point by detecting a voltage change of opposing two resistive membranes, and the contact sensor 115 can be a electromagnetic induction touch panel that identifies the contact position or point by detecting electromagnetic induction that is generated when an object such as the electronic pointer 4 or the user hand H contacts the display 3. Further, the contact sensor 115 can use any input device other than a touch panel.

The electronic pointer controller 116 communicates with the electronic pointer 4 to determine whether the electronic pointer 4 is pressed against the display 3.

The CPU 101, the ROM 102, the RAM 103, the SSD 104, the network controller 105, the external memory controller 106, the capture device 111, the GPU 112, the sensor controller 114, and the electronic pointer controller 116 can be connected to a bus 120 having an address bus and data bus.

The electronic information board 2 can be used as a "host apparatus" that initiates the remote-location sharing process, and can be used as a "participant apparatus" that participates the already-started remote-location sharing process as a later-participating apparatus.

A description is given of capabilities of the electronic information board 2. The capabilities of electronic information board 2 can be implemented or devised by the above described hardware, plurality of programs, and various data.

Figure 3:
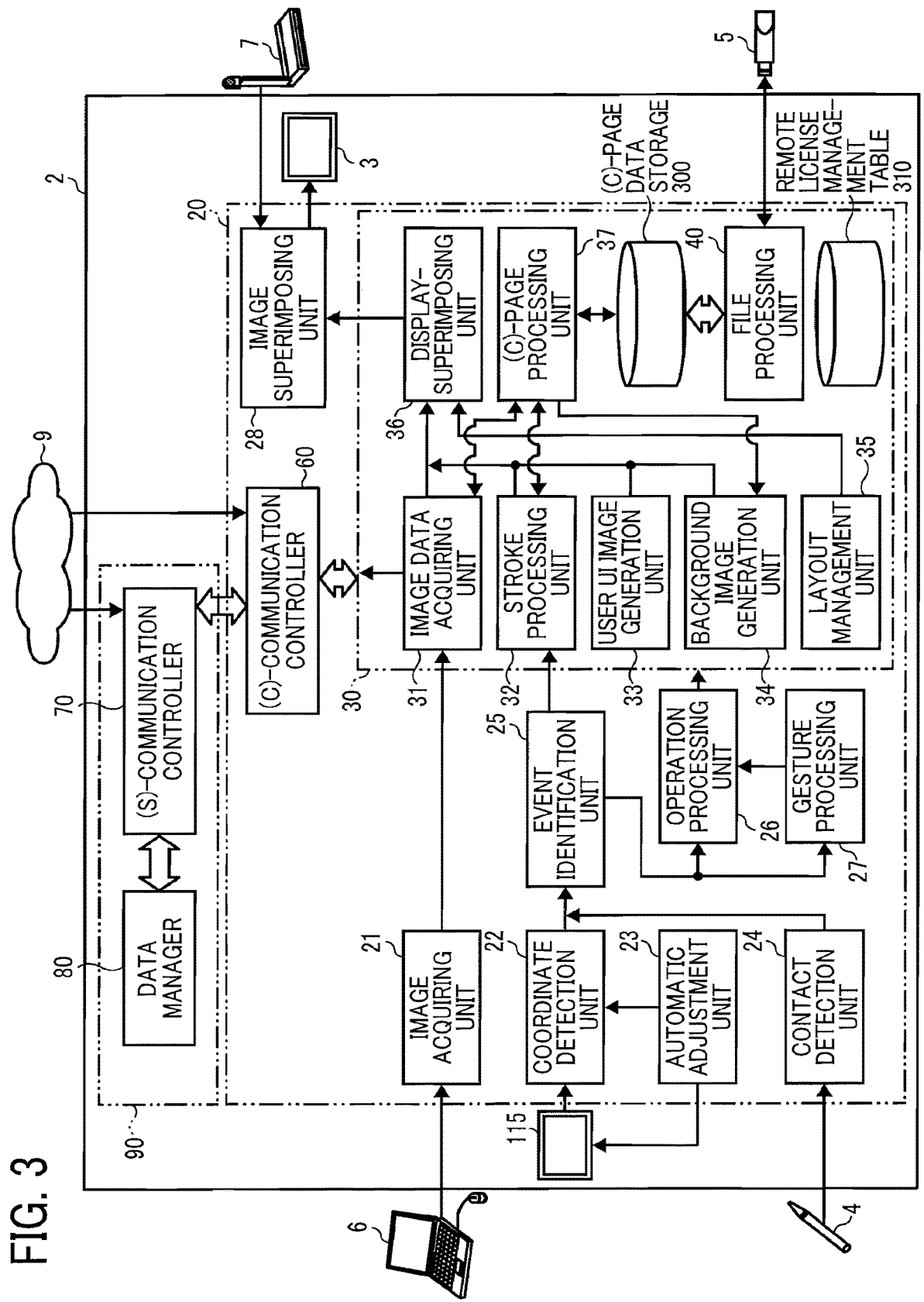
FIG. 3 illustrates a block diagram of capabilities of the electronic information board.

A description is given of an example of capabilities of the electronic information board 2 with reference to FIG. 3. The electronic information board 2 includes a client unit 20 and a server unit 90.

When the electronic information board 2 is used as the "host apparatus," both of the client unit 20 and the server unit 90 are activated in the electronic information board 2. By contrast, when the electronic information board 2 is used as the "participant apparatus," the client unit 20 is activated but the server unit 90 is not activated in the electronic information board 2.

Therefore, when the first electronic information board 2a is used as the "host apparatus" and the second electronic information board 2b is used as the "participant apparatus," the client unit 20 of the first electronic information board 2a communicates with the client unit 20 of the second electronic information board 2b via the server unit 90 of the first electronic information board 2a. By contrast, the client unit 20 of the second electronic information board 2b communicates with the client unit 20 of the first electronic information board 2a via the server unit 90 of the first electronic information board 2a.

A description is given of capabilities of the client unit 20. As illustrated in FIG. 3, the client unit 20 includes, for example, an image acquiring unit 21, a coordinate detection unit 22, an automatic adjustment unit 23, a contact detection unit 24, an event identification unit 25, an operation processing unit 26, a gesture processing unit 27, an image superimposing unit 28, an image processing unit 30, and a (c)-communication controller 60.

The image processing unit 30 includes, for example, an image data acquiring unit 31, a stroke processing unit 32, an user interface (UI) image generation unit 33, a background image generation unit 34, a layout management unit 35, a display-superimposing unit 36, a (c)-page processing unit 37, a (c)-page data storage 300, a remote license management table 310, and a file processing unit 40, in which (c) indicates a unit used in the client unit 20.

The image acquiring unit 21 acquires an image output from the note PC 6 communicably connected or coupled to the electronic information board 2 (hereinafter referred to as "PC-output image"). Further, the image acquiring unit 21 analyzes the acquired PC-output image, and extracts image information of the image displayed at the note PC 6 such as image resolution and image updating frequency. The image acquiring unit 21 outputs the acquired PC-output image and the image information to the image data acquiring unit 31.

When the electronic pointer 4 or the user hand H contacts the display 3, the coordinate detection unit 22 detects coordinates of a position where the electronic pointer 4 or the user hand H contacts the display 3. Further, the coordinate detection unit 22 detects an area size of a contacted portion on the display 3. The coordinate detection unit 22 outputs a detection result to the event identification unit 25.

The automatic adjustment unit 23 is activated when a power is supplied to the electronic information board 2, and adjusts various parameters of the contact sensor 115 so that the contact sensor 115 can output suitable values to the coordinate detection unit 22.

The contact detection unit 24 detects whether the electronic pointer 4 is pressed against the display 3 by communicating with the electronic pointer 4. The contact detection unit 24 outputs a detection result to the event identification unit 25.

The event identification unit 25 determines or identifies types of events based on the coordinates of the position detected by the coordinate detection unit 22 and the detection result of the contact detection unit 24. The event includes, for example, a "stroke drawing" event, a "user interface (UI) operation" event, and a "gesture operation" event. Hereinafter, the coordinates of the position detected by the coordinate detection unit 22 and the detection result of the contact detection unit 24 may be collectively referred to as "event information."

The "stroke drawing" event is an event that is started when a user presses the electronic pointer 4 on the display 3, moves the electronic pointer 4 while contacting the electronic pointer 4 on the display 3, and is ended when the electronic pointer 4 is released from the display 3. By performing the stroke drawing event, for example, alphabets "S" and "T can be drawn on the display 3.

The "stroke drawing" event means, for example, a drawing of stroke image, deleting of an already-drawn stroke image, and editing of an already-drawn stroke image.

The "UI operation" event is an event that a user touches an UI element (e.g., button, list, check box, text box) by using the electronic pointer 4 or the hand H when a user interface (UI) image is displayed on the display 3. By performing the "UI operation," for example, color and line of a drawing image can be set.

The "gesture operation" event is an event that a user touches the display 3 by using the hand H, and moves the hand H on or over the display 3. For example, when the user moves the hand H on or over the display 3 while contacting the hand H on the display 3, the image expansion or reduction, a display region change, and page switching can be performed.

Then, the event identification unit 25 outputs the event information to any one of the stroke processing unit 32, the operation processing unit 26 and the gesture processing unit 27 depending on the determination result by the event identification unit 25.

Figure 4:
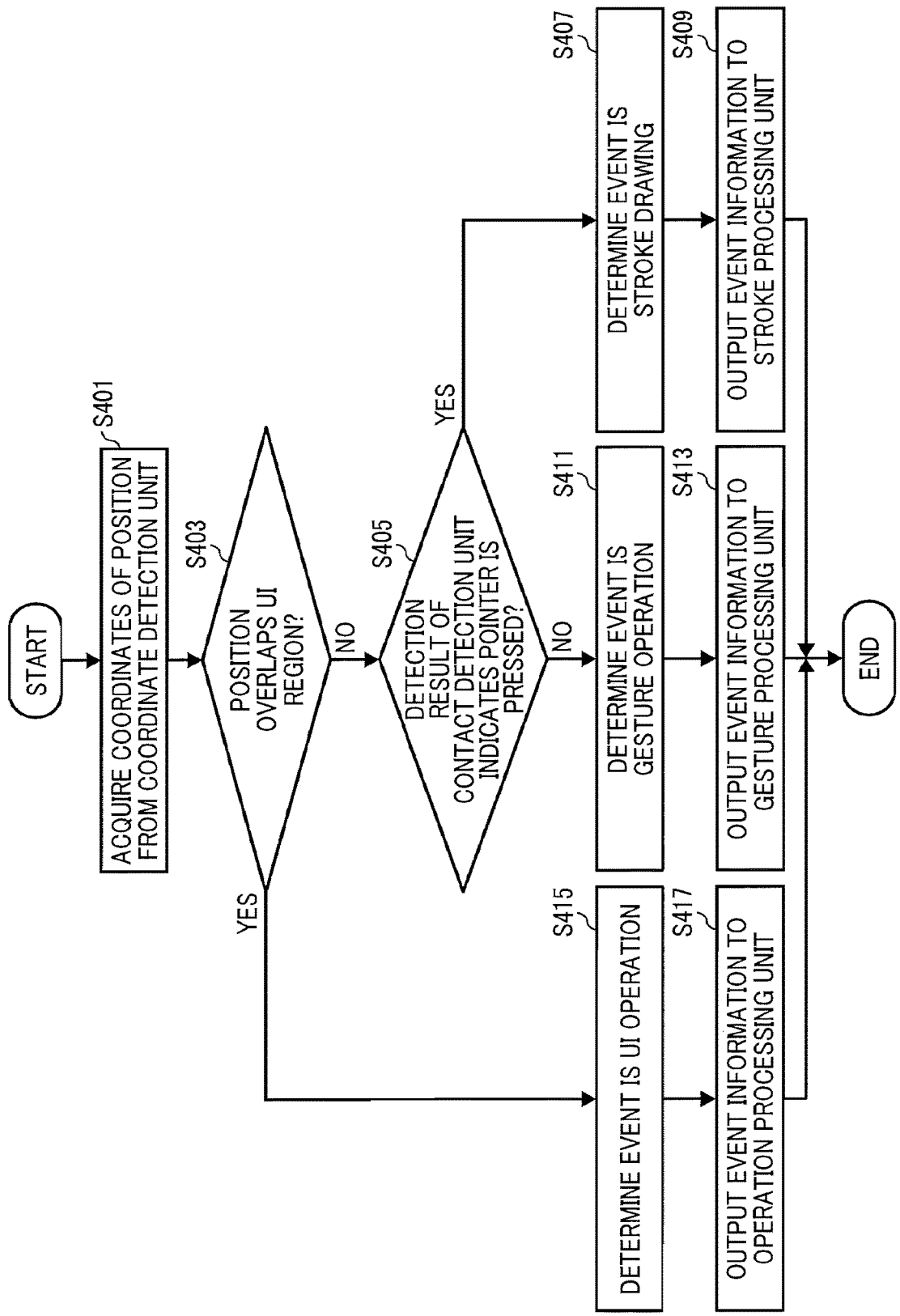
FIG. 4 is a flow chart illustrating the steps of a process at an event identification unit.

A description is given of processing at the event identification unit 25 (hereinafter referred to as "event identification process") with reference to FIG. 4.

At step S401, the event identification unit 25 acquires the coordinates of the position of the object such as the electronic pointer 1 or hand H on or over the display 3 from the coo At step S403, the event identification unit 25 determines whether the position overlaps an UI region. The UI region (see FIG. 19) means a region on a display screen where one or more UI elements are displayed. If the position does not overlap the UI region (S403: NO), the sequence proceeds to step S405.

At step S405, the event identification unit 25 determines whether the electronic pointer 4 is pressed against the display 3. If a detection result of the contact detection unit 24 indicates that the electronic pointer 4 is pressed against the display 3 (S405: YES), the sequence proceeds to step S407.

At step S407, the event identification unit 25 determines that the event is the "stroke drawing" event.

At step S409, the event identification unit 25 outputs the event information to the stroke processing unit 32, and ends the event identification process.

By contrast, if the event identification unit 25 determines that the electronic pointer 4 is not pressed against the display 3 (S405: NO), the sequence proceeds to step S411.

At step S411, the event identification unit 25 determines that the event is the "gesture operation" event.

At step S413, the event identification unit 25 outputs the event information to the gesture processing unit 27, and ends the event identification process.

Further, if the event identification unit 25 determines that the position overlaps the UI region (S403: YES), the sequence proceeds to step S415.

At step S415, the event identification unit 25 determines that the event is the "UI operation" event.

At step S417, the event identification unit 25 outputs the event information to the operation processing unit 26, and ends the event identification process.

A description is returned to FIG. 3. When the event identification unit 25 determines that the event information is the "UI operation" event and the operation processing unit 26 receives the event information from the event identification unit 25, the operation processing unit 26 performs an operation corresponding to the UI element of the "UI operation" event. For example, the "UI operation" event includes operations such as COPY, CUT, PASTE, and the operation processing unit 26 reports the copying, cutting, and/or pasting operations to the image processing unit 30.

The gesture processing unit 27 receives the event information determined as the "gesture operation" event by the event identification unit 25, and performs an operation corresponding to the event information.

The stroke processing unit 32 receives the event information determined as the "stroke drawing" event by the event identification unit 25. The stroke processing unit 32 performs, for example, drawing of stroke image, deleting of an already drawn stroke image, and editing of an already drawn stroke image. Further, when the stroke processing unit 32 receives the copying, cutting, and/or pasting operations, the stroke processing unit 32 performs the copying, cutting, and/or pasting operations.

Figure 28:
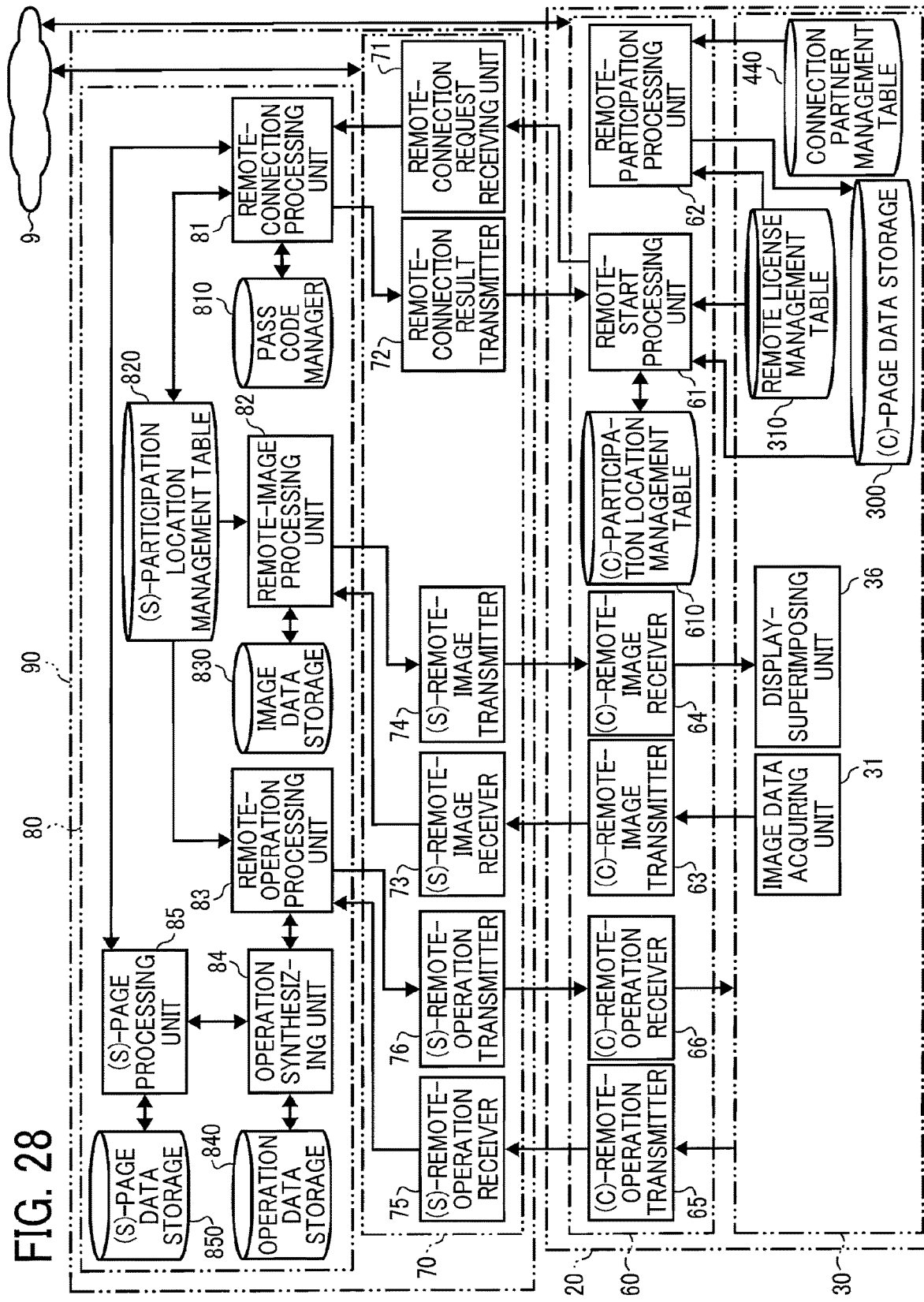
FIG. 28 illustrates a block diagram of capabilities of a server unit and a client unit.

Each of the results of drawing, deleting, editing, copying, cutting, and/or pasting of stroke image is output to the display-superimposing unit 36 and the (c)-page processing unit 37, and is stored in an operation data storage 840 of a data manager 80 as operation data (see FIG. 28).

Figure 5:
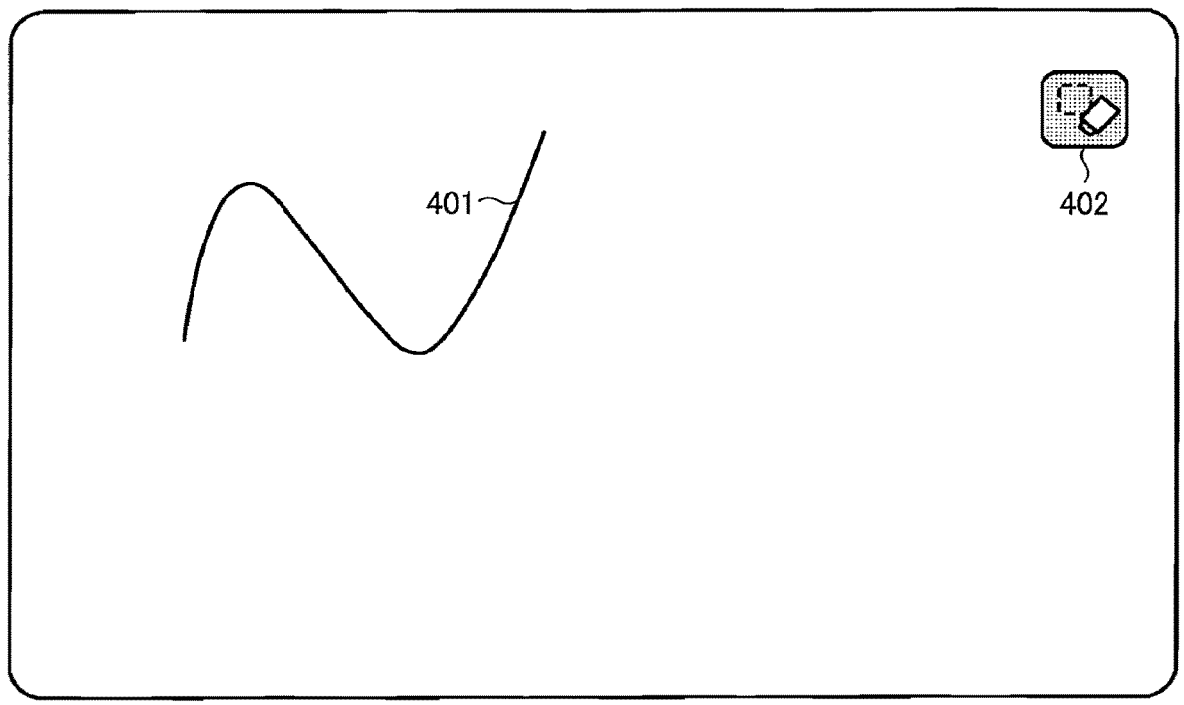
FIG. 5 illustrates copying, cutting, and/or pasting operations of stroke image using a button.

A description is given of the copying, cutting, and/or pasting operations of stroke image. For example, as illustrated in FIG. 5, a stroke image 401 and a button 402, which is one UI element, are displayed on the display 3. Further, a plurality of stroke images can be displayed on the display 3. For simplicity of the description, the button 402 alone is described as the UI element.

Figure 6:
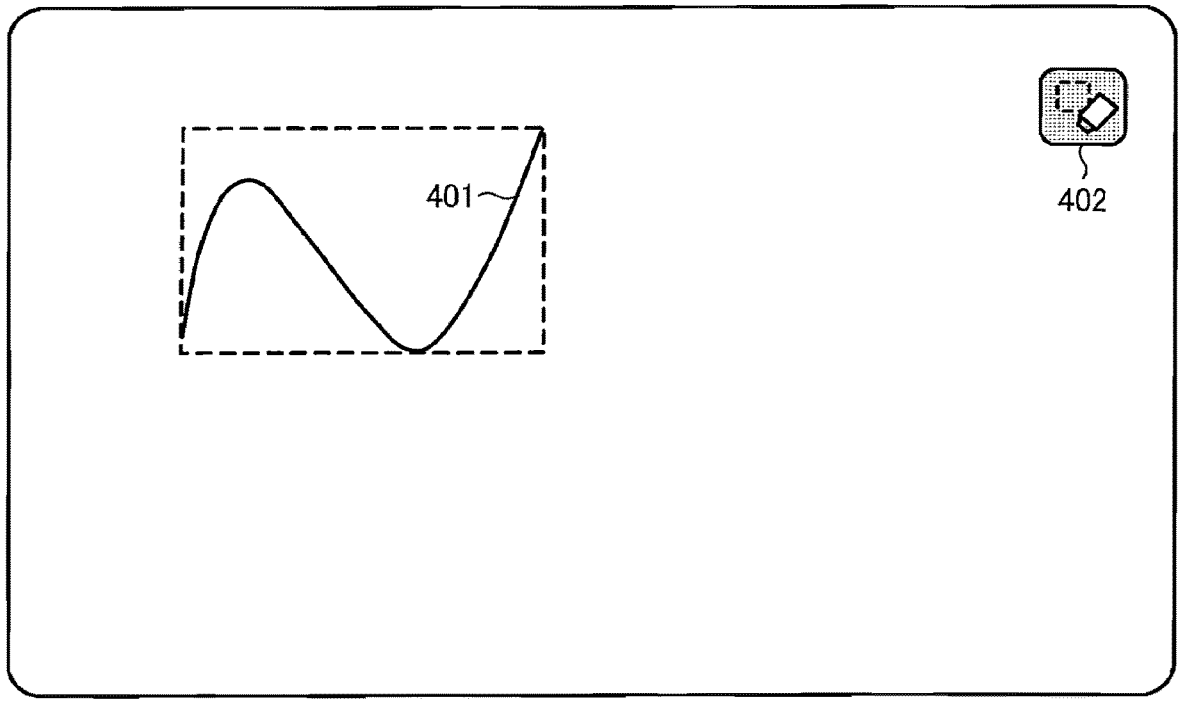
FIG. 6 illustrates a selection of stroke image.

When a user selects the stroke image 401, the stroke image 401 is enclosed by a dot line to indicate that the stroke image 401 is selected (see FIG. 6). The user can select the stroke image 401 by tapping the stroke image 401 or encircling the stroke image 401 with, for example, the user's finger or electronic pointer 4.

Figure 7:
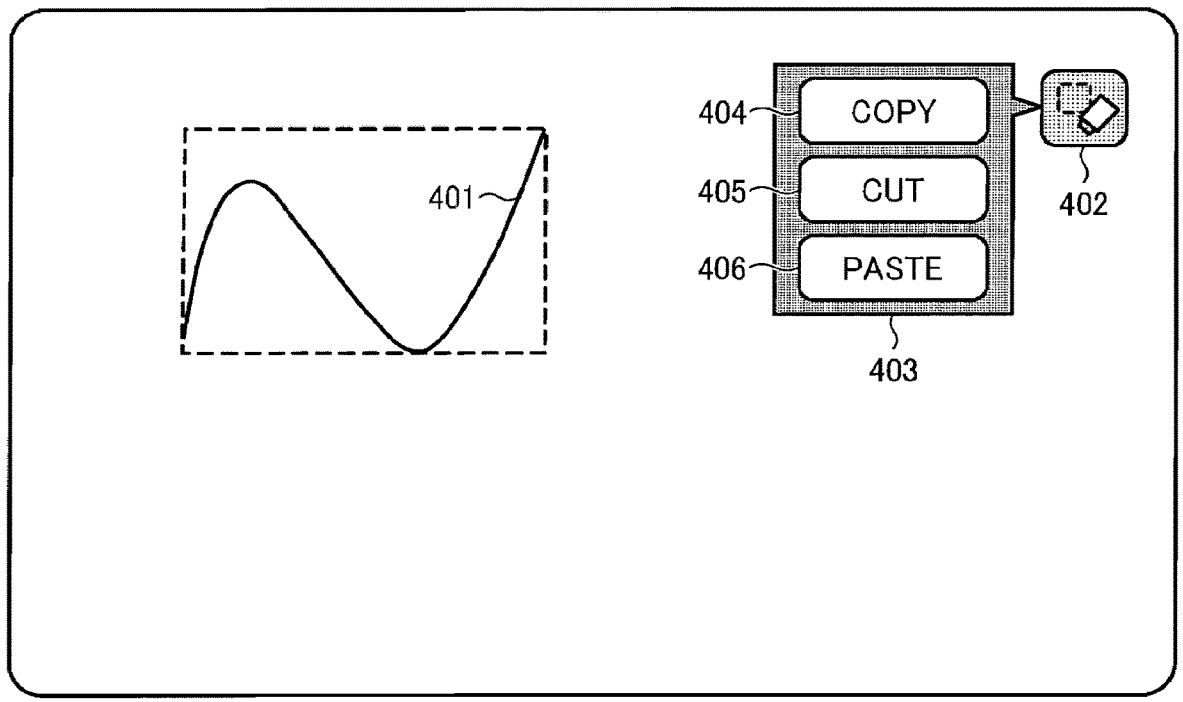
FIG. 7 illustrates a sub-menu.
Figure 8:
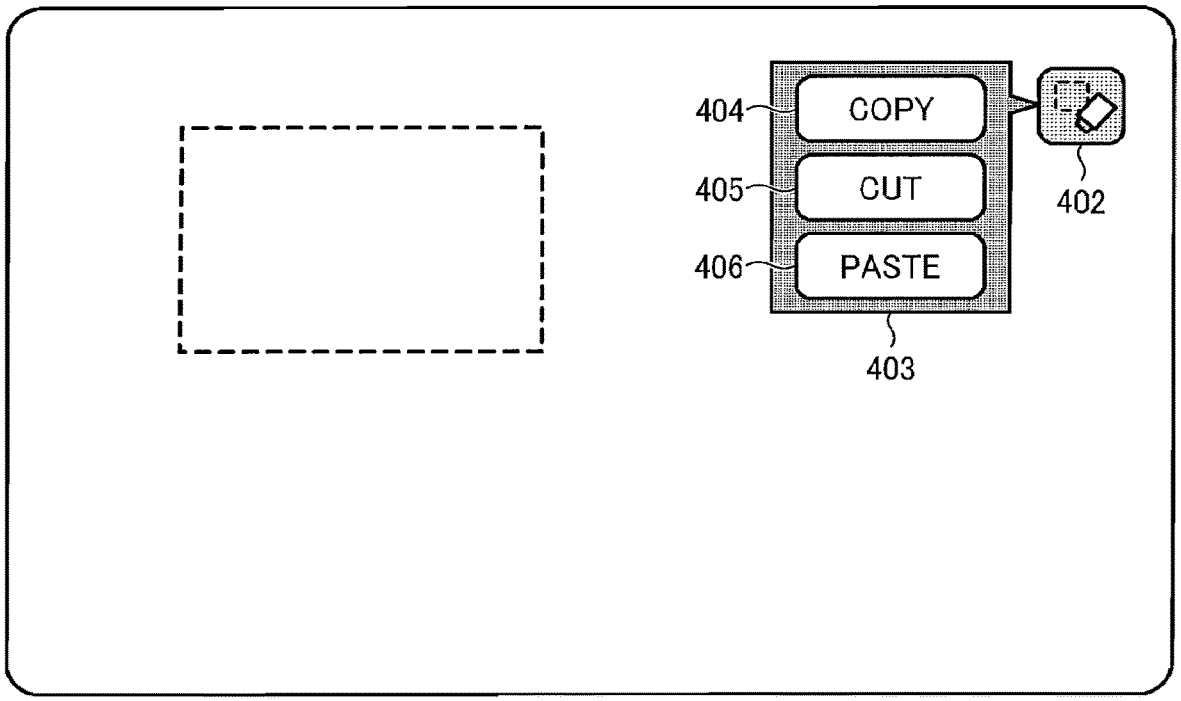
FIG. 8 illustrates a cutting of stroke image.
Figure 9:
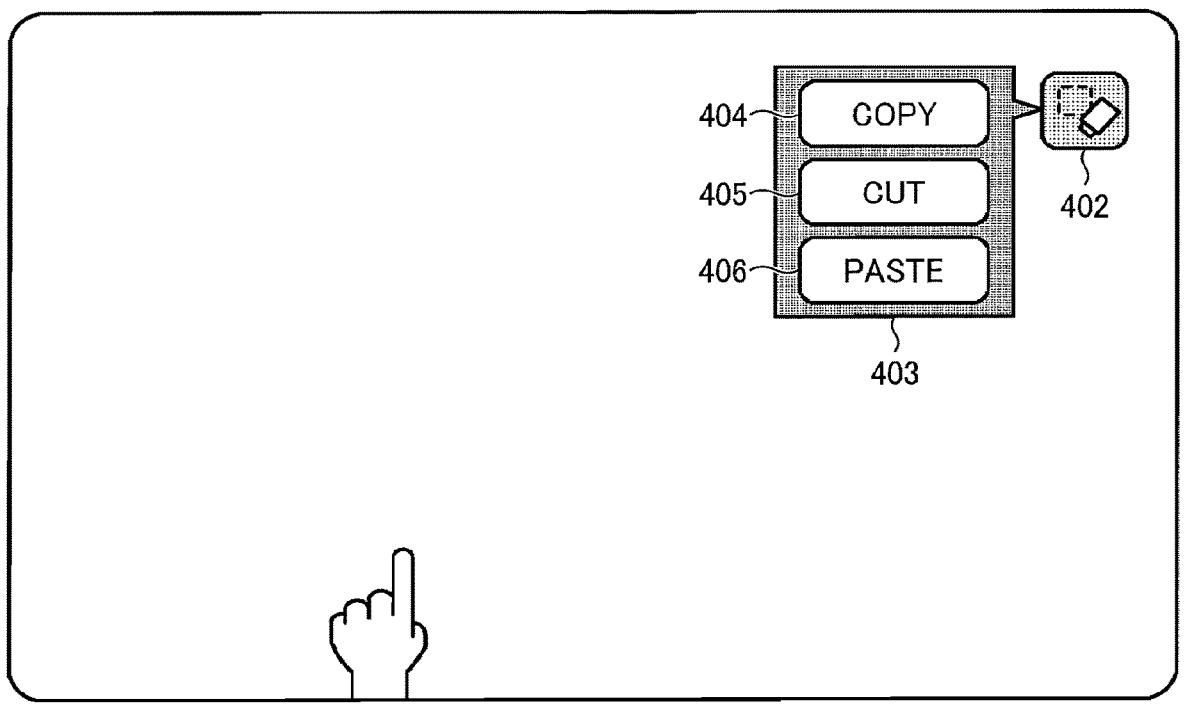
FIG. 9 and FIG. 10 illustrate a pasting of cut stroke image.
Figure 10:
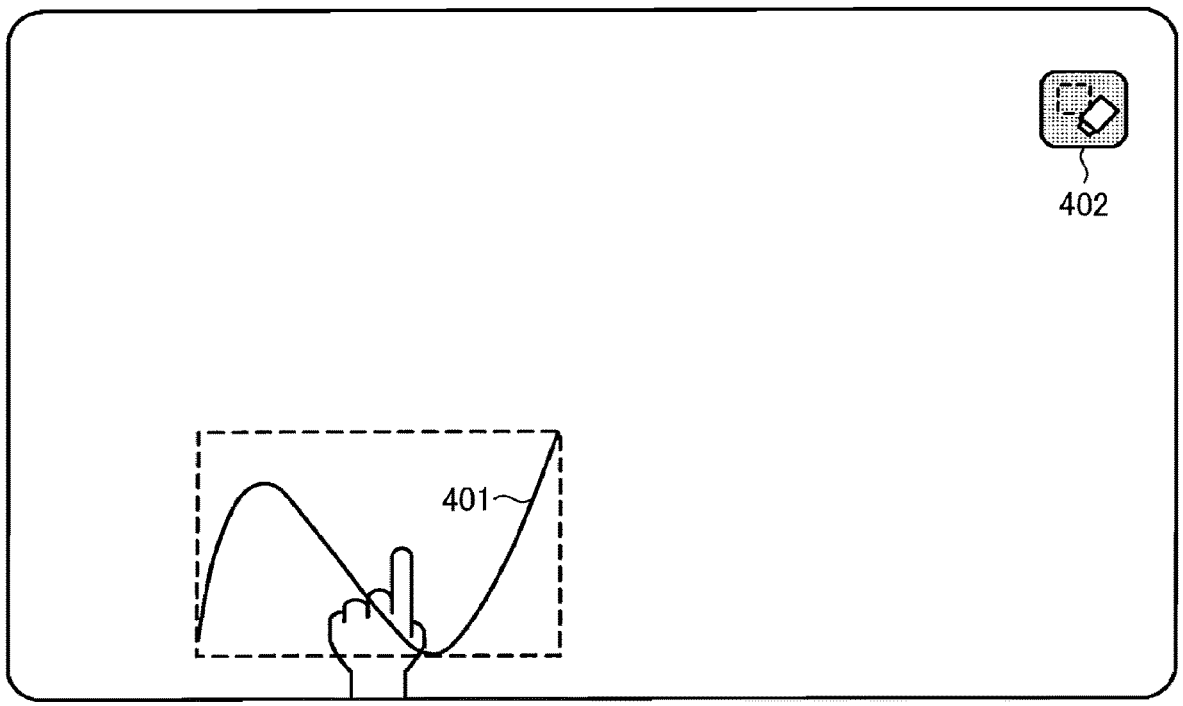
Figure 11:
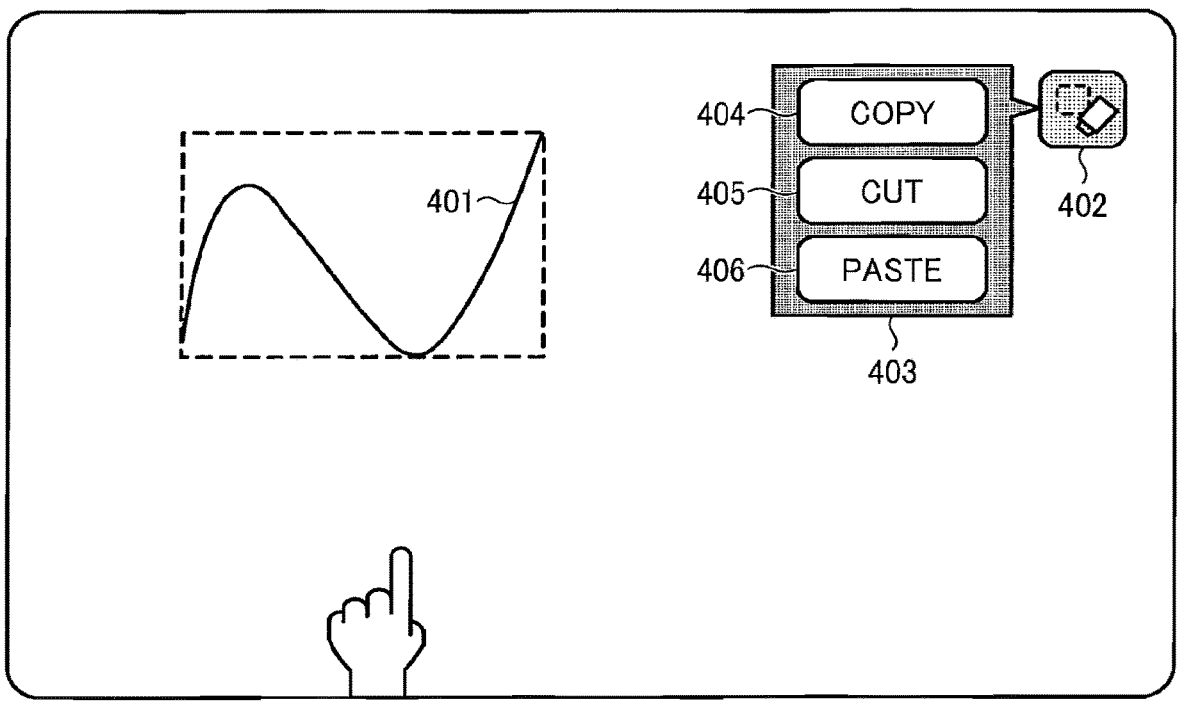
FIG. 11, FIG. 12 and FIG. 13 illustrate a pasting of copied stroke image.
Figure 12:
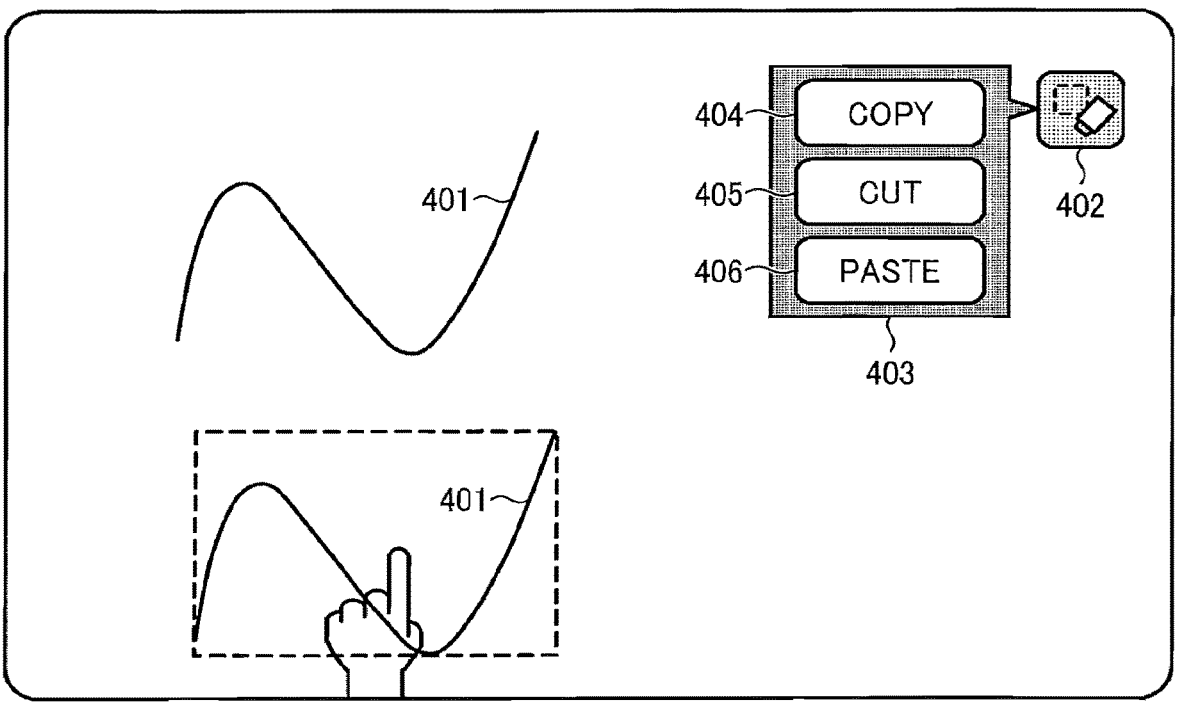
Figure 13:
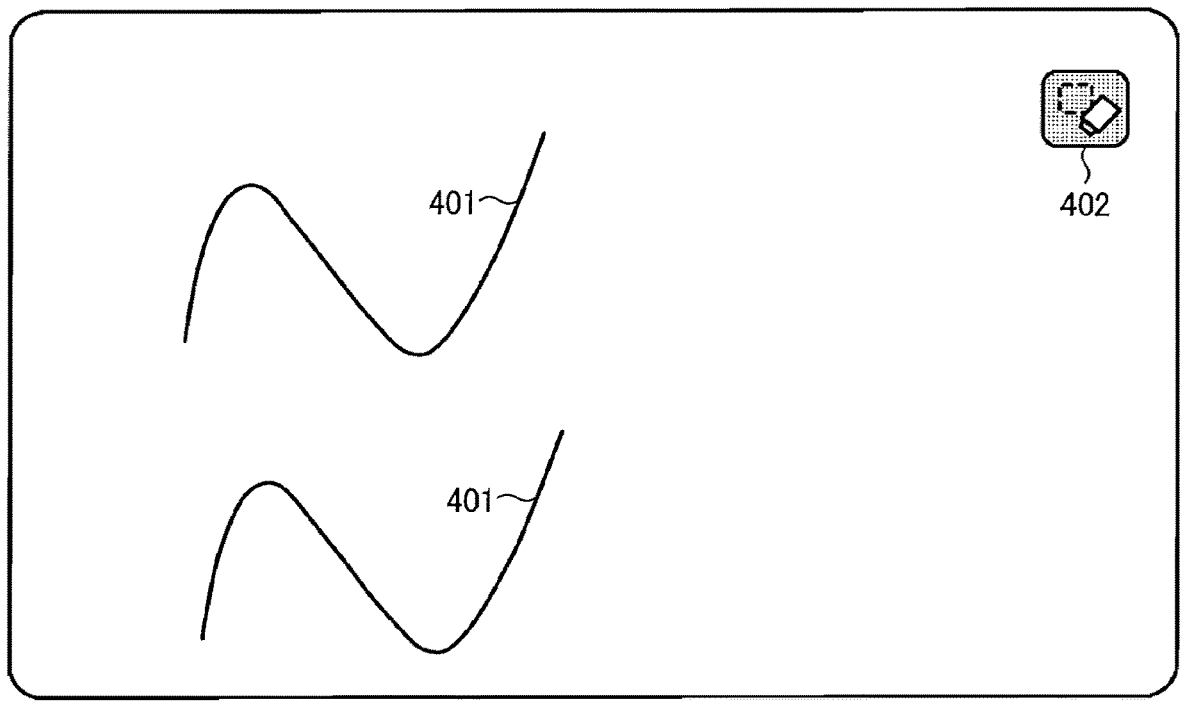

Then, when the user presses the button 402, a sub-menu 403 can be displayed as illustrated in FIG. 7. Then, when the user presses a "cut" button 405 in the sub-menu 403, data of the stroke image 401 (stroke data) is stored in the (c)-page data storage 300 via the (c)-page processing unit 37 while the stroke image 401 is deleted from the display 3 (see FIG. 8).

Then, when the user presses a "paste" button 406 in the sub-menu 403, and the user taps a position on the display 3 that the user wants to paste the stroke image 401 (see FIG. 9), the data of the stroke image 401, stored in the (c)-page data storage 300, is read out from the (c)-page data storage 300 via the (c)-page processing unit 37. Then, the stroke image 401 is generated based on the data of the stroke image 401, and the stroke image 401 is pasted at the position tapped by the user (see FIG. 10). The position tapped by the user can be determined based on the detection result of the coordinate detection unit 22.

Further, when the user presses a "copy" button 404 in the sub-menu 403 (see FIG. 7), the data of the stroke image 401 is stored in the (c)-page data storage 300 via the (c)-page processing unit 37, in which the stroke image 401 is not deleted from the display 3.

Then, when the user presses a "paste" button 406 in the sub-menu 403, and the user taps a position on the display 3 that the user wants to paste the stroke image 401 (see FIG. 11), the data of the stroke image 401, stored in the (c)-page data storage 300, is read out from the (c)-page data storage 300 via the (c)-page processing unit 37. Then, the stroke image 401 is generated based on the data of the stroke image 401, and the stroke image 401 is pasted at the position tapped by the user (see FIG. 12), in which a duplication of the stroke image 401 is also displayed on the display 3 (see FIG. 13).

Figure 14:
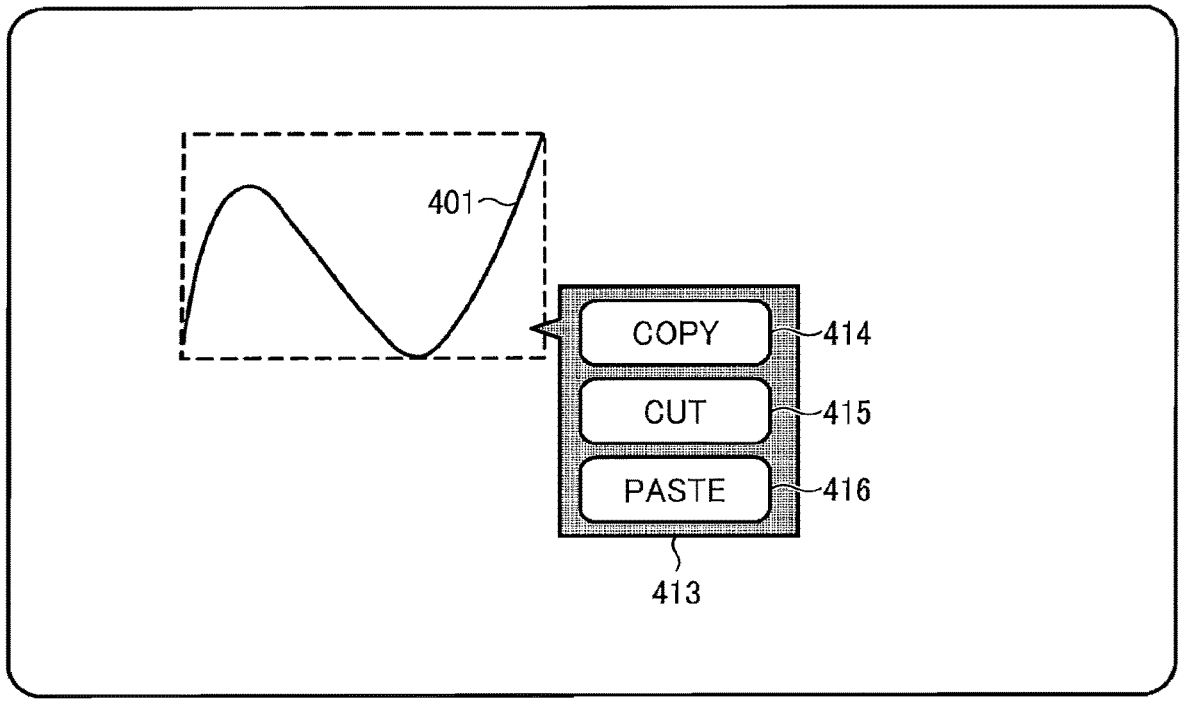
FIG. 14 illustrates copying, cutting, and pasting operations of a stroke image using a context menu.

Further, instead of the button 402, a context menu can be used. For example, when a user selects the stroke image 401, a context menu 413 can be displayed as illustrated in FIG. 14. In this case, when the stroke image is selected, the context menu 413 is automatically displayed but not limited hereto.

When the user selects a "copy" 414 in the context menu 413, the data of the stroke image 401 is stored in the (c)-page data storage 300 via the (c)-page processing unit 37.

Figure 15:
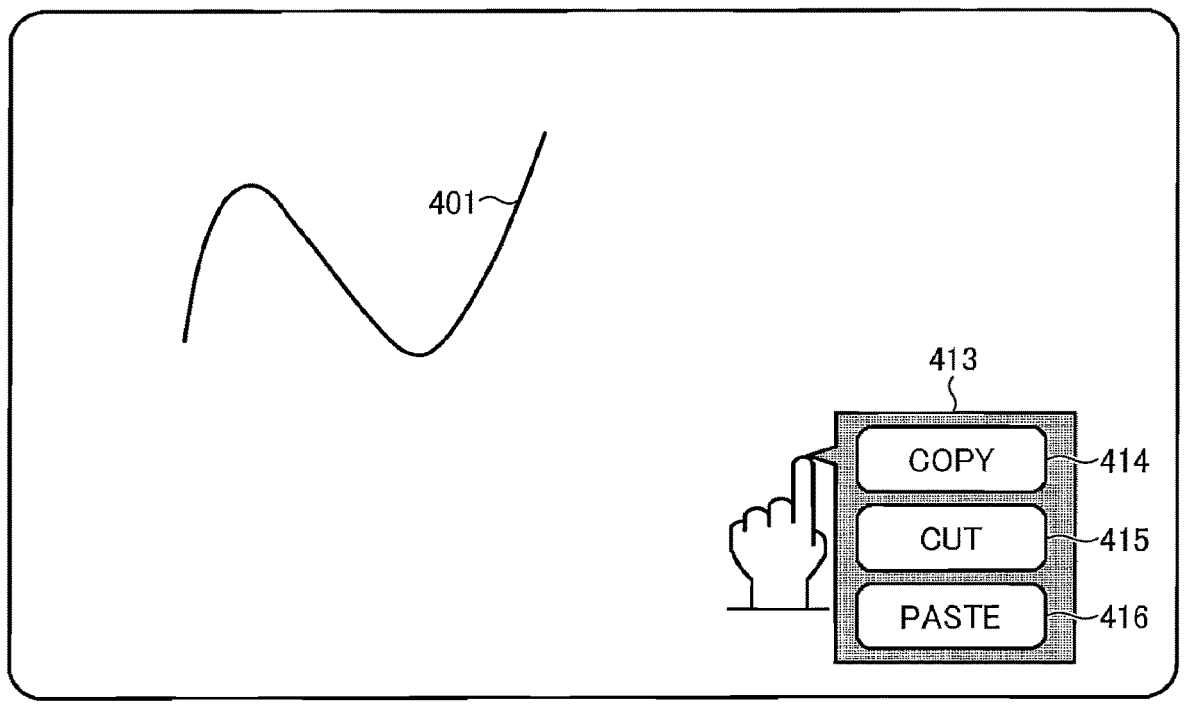
FIG. 15, FIG. 16 and FIG. 17 illustrate copying and pasting of stroke image using the context menu.
Figure 16:
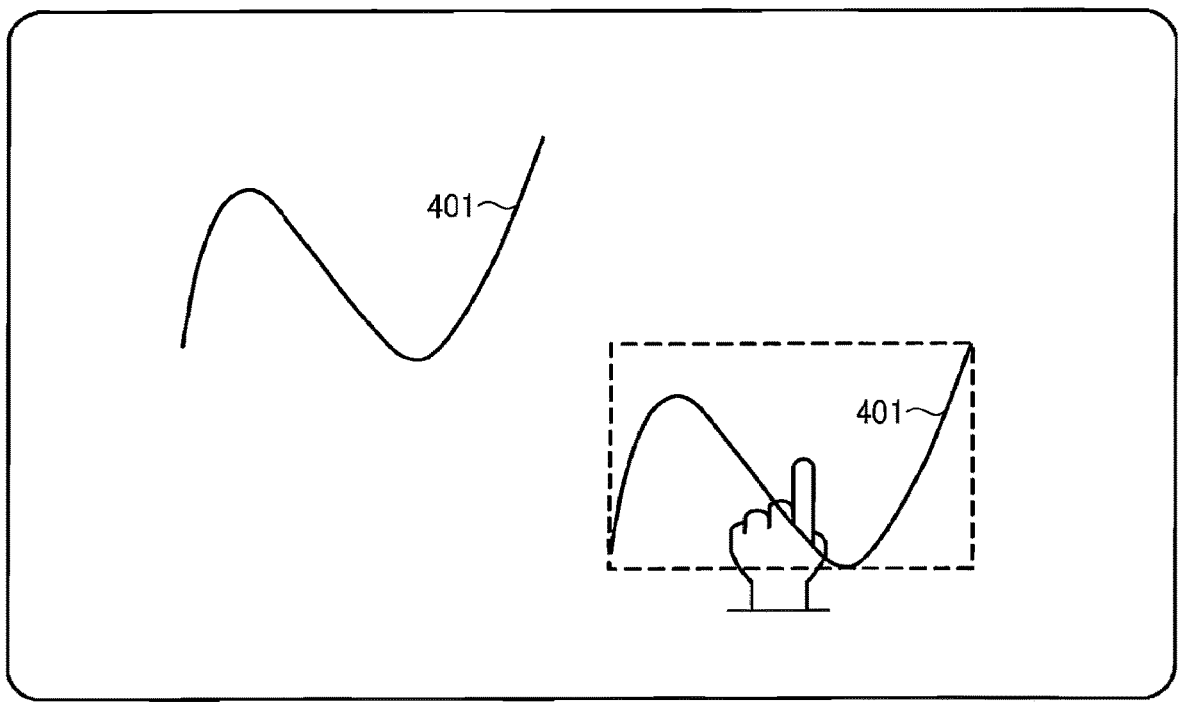

Then, when the user presses a paste-wanted position on the display 3 for a longer time, the context menu 413 is displayed near the paste-wanted position (see FIG. 15). When a "paste" 416 is selected from the context menu 413, the data of the stroke image 401, stored in the (c)-page data storage 300, is read out from the (c)-page data storage 300 via the (c)-page processing unit 37. Then, the stroke image 401 is generated based on the data of the stroke image 401, and the stroke image 401 is pasted at the paste-wanted position (see FIGS. 16 and 17). The paste-wanted position can be designated by pressing the paste-wanted position for a longer time but not limited hereto. For example, the paste-wanted position can be designated by tapping two points. Further, the paste-wanted position can be designated by setting a gesture.

The image superimposing unit 28 displays an image superimposed by the display-superimposing unit 36 (hereinafter referred to as "superimposed image") on the display 3. Further, the image superimposing unit 28 can display the superimposed image on the entire area of the display 3 and an image transmitted from the teleconference terminal 7 at a part of the display 3 as a separately-displayed image (i.e., picture in picture). Further, the image superimposing unit 28 can display the separately-displayed-image on the entire area of the display 3 by performing a display switching with the superimposed image.

The image data acquiring unit 31 acquires frame information included in the PC-output image transmitted from the image acquiring unit 21 as an image, and outputs the image to the display-superimposing unit 36 and the (c)-page processing unit 37. Hereinafter the image acquired by the image data acquiring unit 31 is referred to as "PC-output image."

The UI image generation unit 33 generates pre-set UI image, and outputs the UI image to the display-superimposing unit 36.

The (c)-page processing unit 37 reads out page data from the (c)-page data storage 300, in which the page data includes media data. When the background image generation unit 34 receives the media data from the (c)-page processing unit 37, the background image generation unit 34 outputs the media data to the display-superimposing unit 36. The background image may employ various patterns such as blank, grid or the like.

The layout management unit 35 manages information of a layout of an image output from the image data acquiring unit 31, an image output from the stroke processing unit 32, an image output from the UI image generation unit 33, and an image output from the background image generation unit 34 (hereinafter referred to as "layout information"). The layout management unit 35 outputs the layout information to the display-superimposing unit 36.

With employing this configuration, the layout management unit 35 can designate positions where the PC-output image and the stroke image are displayed on the display 3, and transmit the designated positions to the display-superimposing unit 36, in which positions for displaying the PC-output image and the stroke image on the UI image and the background image can be designated, or the layout management unit 35 can designate non-display of the PC-output image and the stroke image.

Based on the layout information received from the layout management unit 35, the display-superimposing unit 36 performs the layout processing for the image output from the image data acquiring unit 31, the image output from the stroke processing unit 32, the image output from the UI image generation unit 33 and/or the image output from the background image generation unit 34.

The (c)-page processing unit 37 collectively stores data of the stroke image and data of the PC-output image as one page data in the (c)-page data storage 300.

Figures 17, 18:
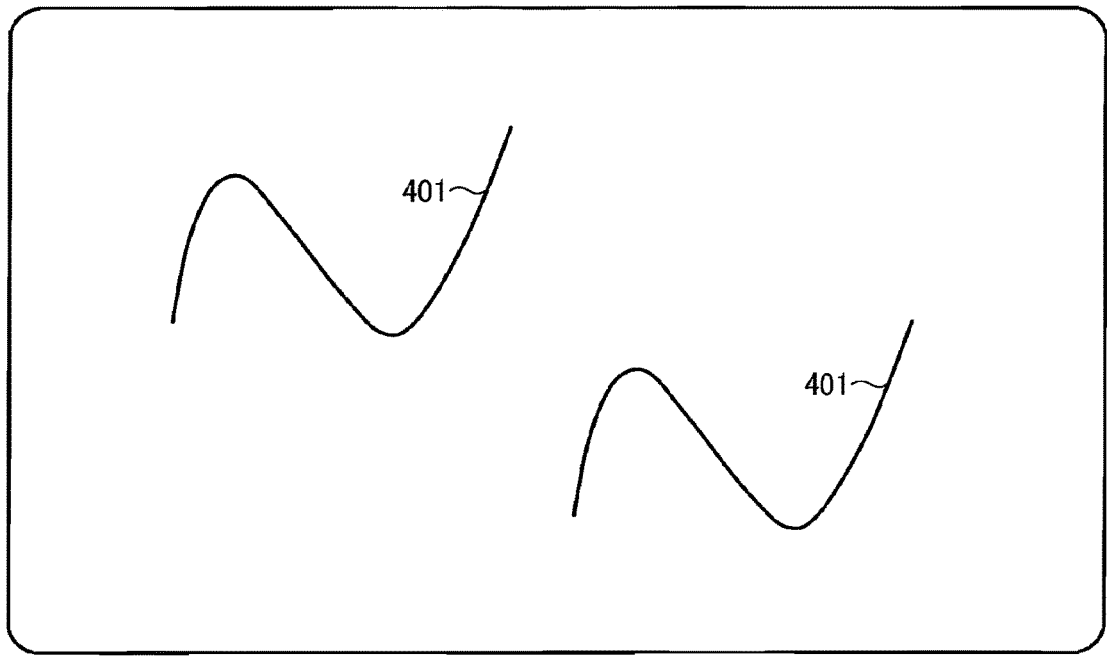
FIG. 18 is an example of page data.

A description is given of an example of the page data with reference to FIG. 18. The page data includes, for example, page data ID, a start time point, an end time point, stroke arrangement data ID, and media data ID.

The page data ID is an identification (ID) to identify each page. The start time point indicates a start time when one concerned page is started to be displayed. The end time point indicates an end time when updating of the one concerned page data is ended. The stroke arrangement data ID is an identification (ID) to identify the stroke arrangement data generated by the "stroke drawing" event.

The media data ID is an identification (ID) to identify the media data. The stroke arrangement data is data used for displaying the stroke image on the display 3. The media data is data used for displaying the background image on the display 3.

The data of stroke image is a part of the page data. The data of stroke image is used as the stroke arrangement data correlated to the stroke arrangement data ID. The data of the PC-output image is a part of the page data. The data of the PC-output image is used as the media data correlated to the media data ID. Then, when the media data is read out from the (c)-page data storage 300, the media data is used as data of the background image.

When the (c)-page processing unit 37 transmits the media data included in the temporarily stored page data to the display-superimposing unit 36 via the background image generation unit 34, the image superimposing unit 28 can re-display the background image on the display 3.

Further, when the (c)-page processing unit 37 returns the stroke arrangement data included in the temporarily stored page data to the stroke processing unit 3, the stroke image can be re-edited. Further, the (c)-page processing unit 37 can delete and duplicate the page data.

Therefore, at a time when the (c)-page processing unit 37 stores the page data in the (c)-page data storage 300, the data of the PC-output image displayed on the display 3 is stored in the (c)-page data storage 300. Then, when the data of the PC-output image is read out from the (c)-page data storage 300 later, the data of the PC-output image is read out as the media data indicating the background image.

Then, the (c)-page processing unit 37 outputs the stroke arrangement data in the page data, read out from the (c)-page data storage 300, to the stroke processing unit 32. Further, the (c)-page processing unit 37 outputs the media data in the page data, read out from the (c)-page data storage 300, to the background image generation unit 34.

The display-superimposing unit 36 superimposes the PC-output image received from the image data acquiring unit 31, the stroke image received from the stroke processing unit 32, the UI image received from the UI image generation unit 33, and the background image received from the background image generation unit 34 based on the layout designated by the layout management unit 35.

Figure 19:
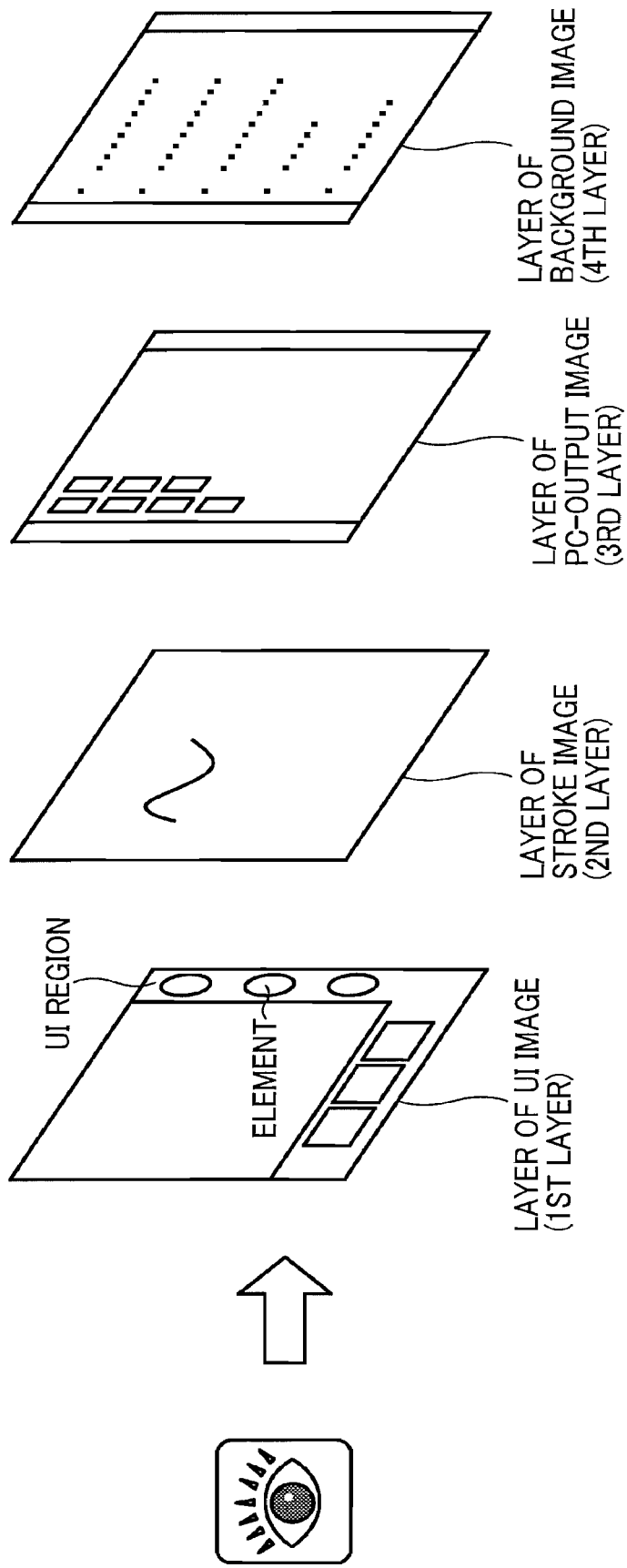
FIG. 19 is an example of superimposing of a plurality of images.

As illustrated in FIG. 19, a plurality of layers such as a layer of UI image, a layer of the stroke image, a layer of the PC-output image, and a layer of the background image can be superimposed by setting, for example, the UI image as the first layer, the stroke image as the second layer, the PC-output image as the third layer, and the background image as the fourth layer when viewed from a user.

Further, the display-superimposing unit 36 can switch the PC-output image and the background image when superimposing the PC-output image or the background image to the UI image and the stroke image, which means the PC-output image and the background image can be exclusively used. For example, when the cable 10 between the electronic information board 2 and the note PC 6 is disconnected while displaying the UI image, the stroke image and the PC-output image as a superimposed image on the display 3, the PC-output image is deleted from the superimposed image under the instruction of the layout management unit 35, and then the background image is displayed instead of the PC-output image. Further, the display-superimposing unit 36 performs the display expansion, display reduction, and moving of display region.

FIG. 20 illustrates an example of the stroke arrangement data. As indicated in FIG. 21, one stroke arrangement data is composed of a plurality of stroke data. Each of the stroke data is generated when each of the "stroke drawing" events is performed.

For example, when a user draws an alphabet "S" by using the electronic pointer 4, one character alphabet "S" is drawn with one stroke data ID because the alphabet "S" is drawn by one stroke. Further, for example, when a user draws an alphabet "T" by using the electronic pointer 4, one character alphabet "T" is drawn with two stroke data IDs because the alphabet "T" is drawn by two strokes.

Each of the stroke data includes, for example, stroke data ID, a start time point, an end time point, color, width, and coordinate arrangement data ID.

The stroke data ID is an identification (ID) to identify each of the stroke data. The start time point indicates a time of starting a drawing of one concerned stroke. The end time point indicates a time of ending the drawing of the one concerned stroke. The color is a color of the stroke, and the width is a width of the stroke. The coordinate arrangement data ID is an identification (ID) to identify the coordinate arrangement data including information related to passing points of the stroke.

FIG. 21 illustrates an example of the coordinate arrangement data. The coordinate arrangement data includes, for example, X coordinate, Y coordinate, time difference and pointer pressure for each of a plurality of points that the electronic pointer 4 has passed thorough (i.e., passing points) when drawing an image on the display 3. The X coordinate and Y coordinate indicate a position of the electronic pointer 4 on the display 3 when the electronic pointer 4 passes through the positions of each of the passing points. The time difference (e.g., "m" seconds) indicates a difference between the start time point of stroke drawing and a time that the electronic pointer 4 passes through the position of each of the passing points. The pointer pressure indicates a pressure of the electronic pointer 4. For example, when a user draws an alphabet "S" by using the electronic pointer 4, which is drawn by one stroke, the electronic pointer 4 has passed through a plurality of passing points until the end of drawing "S," and thereby the coordinate arrangement data includes information of the plurality of passing points.

FIG. 22 illustrates an example of the media data. Each of the media data includes, for example, media data ID, data type, recording time point, X coordinate, Y coordinate, width, height, and data.

The media data ID is an identification (ID) to identify the media data. The data type indicates a type of the media data. The recording time point indicates a time point when the (c)-page processing unit 37 stores the page data in the (c)-page data storage 300. The X coordinate and Y coordinate indicates a position of an image displayed on the display 3 based on the page data. The width and height indicate an image size. The data indicates contents of the media data.

The position of the image displayed on the display 3 based on the page data indicates a position of the upper left corner of the image with respect to the coordinates of the upper left corner of the display 3 set as (X coordinate, Y coordinate) =(0, 0).

A description is returned to FIG. 3. The remote license management table 310 manages license data required to perform the remote-location sharing process.

FIG. 23 illustrates an example of the remote license management table 310. The remote license management table 310 includes, for example, product ID, license ID, and expiration date. The product ID is an identification (ID) to identify each product such as the electronic information board 2. The license ID is an identification (ID) used for verification of each product such as the electronic information board 2. The expiration date is an expiration date of the license of each product such as the electronic information board 2.

Figure 24:
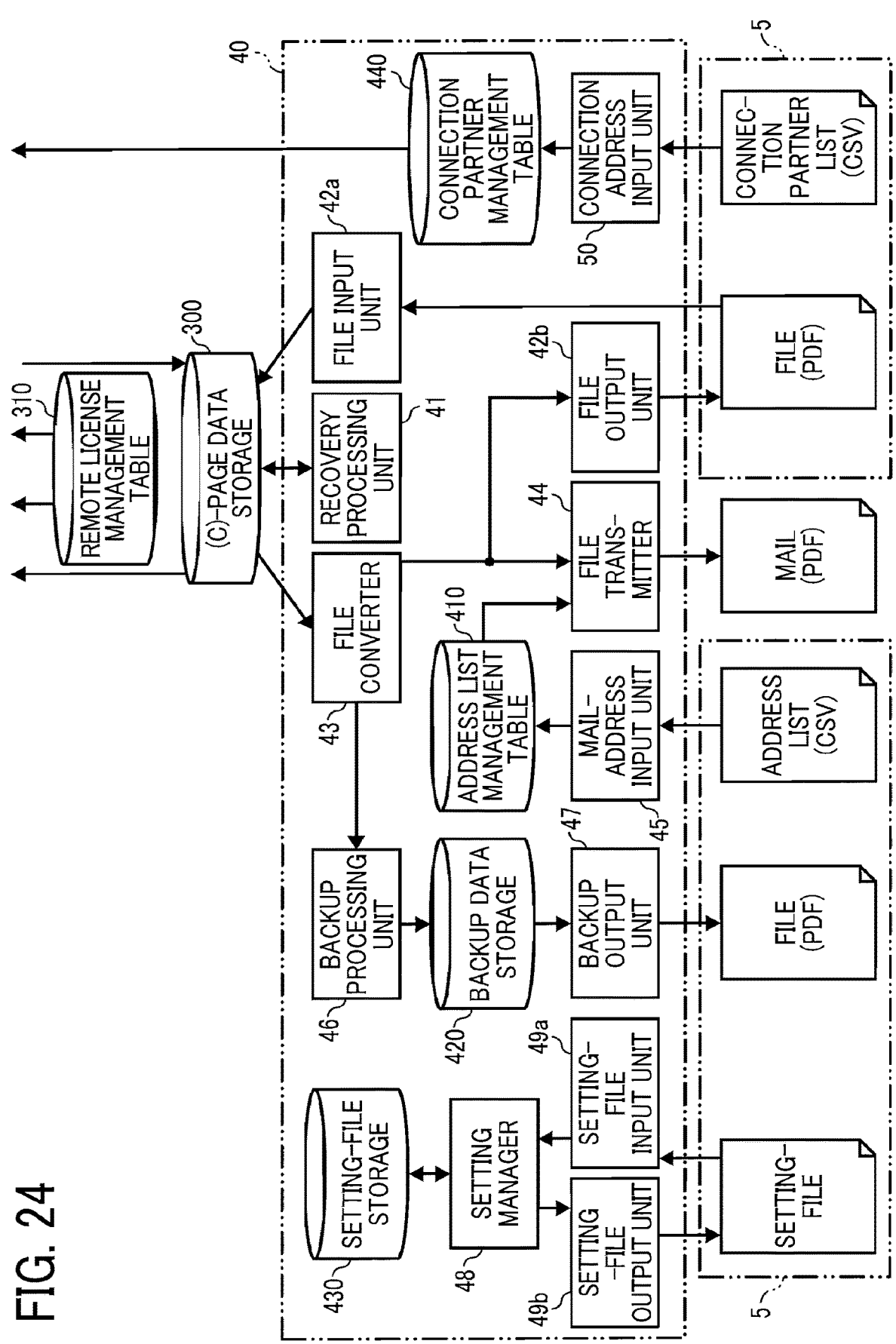
FIG. 24 illustrates a block diagram of capabilities of a file processing unit.

A description is given of capabilities of the file processing unit 40. FIG. 24 is a functional block diagram of the file processing unit 40.

The file processing unit 40 includes, for example, a recovery processing unit 41, a file input unit 42a, a file output unit 42b, a file converter 43, a file transmitter 44, an mail address input unit 45, a backup processing unit 46, a backup output unit 47, a setting manager 48, a setting-file output unit 49b, a setting-file input unit 49a, and an connection address input unit 50.

The file processing unit 40 further includes, for example, an address list management table 410, a backup data storage 420, a setting-file storage 430, and a connection partner management table 440.

When the electronic information board 2 is stopped abnormally due to an abrupt shutdown of a power supply to the electronic information board 2, the recovery processing unit 41 detects the abnormal stop when a power is supplied to the electronic information board 2 again, and recovers or restores the page data.

For example, when the electronic information board 2 is stopped normally, the page data is stored in the USB memory 5 as the PDF file via the file processing unit 40. By contrast, when the electronic information board 2 is stopped abnormally, the page data is still being stored in the (c)-page data storage 300. Therefore, when a power is supplied to the electronic information board 2 again, the recovery processing unit 41 detects the abnormal stop, and reads out the page data from the (c)-page data storage 300 to recover the page data.

The file converter 43 converts the page data stored in the (c)-page data storage 300 to a PDF file. When a plurality of page data is stored in the (c)-page data storage 300, the plurality of the page data can be converted separately, in which the plurality of the page data can be converted into a plurality of PDF files page by page, or the plurality of the page data can be collectively converted into one PDF file. The file converter 43 outputs the converted PDF file to the backup processing unit 46 and the file transmitter 44.

The file input unit 42a reads out the PDF file from the USB memory 5, and stores each page in the (c)-page data storage 300 as the page data. When the plurality of the PDFs file is stored in the USB memory 5, the file input unit 42a reads out all of the plurality of the PDF files from the USB memory 5.

The file output unit 42b stores the PDF file, output from the file converter 43, in the USB memory 5.

The file transmitter 44 adds the PDF file output from the file converter 43 to an electronic mail, and transmits the electronic mail. A user can select a transmission destination of the file from the address list management table 410 displayed on the display 3 via the display-superimposing unit 36 by using the electronic pointer 4 or the hand H.

FIG. 25 illustrates an example of the address list management table 410. The address list management table 410 stores names and mail addresses of the transmission destinations by co-relating the names and mail addresses of the transmission destinations.

Further, a user can input the mail addresses of the transmission destinations by using the electronic pointer 4.

The mail address input unit 45 reads out the mail address list file (i.e., address list) from the USB memory 5, and stores the mail address list file in the address list management table 410.

The backup processing unit 46 stores a file output from the file output unit 42b, and a file transmitted from the file transmitter 44 in the backup data storage 420 to perform the backup processing.

FIG. 26 illustrates an example of the backup data. For example, the backup data can be stored as a PDF format file (PDF file). The backup processing is performed when a user set a "backup is effective" and the backup processing is not performed when a user does not set the "backup is effective."

The backup output unit 47 stores the backup file in the USB memory 5. When the backup output unit 47 stores the backup file, a user is requested to input a password to secure the data security. Further, a file stored in the USB memory 5 can be read by the file input unit 42a.

The setting manager 48 stores various setting information of the electronic information board 2 in the setting-file storage 430, and reads out the various setting information from the setting-file storage 430. The various setting information includes, for example, network information, date and time, area (e.g., country) and language, mail server information, address list, connection partner list, and backup information. The network information includes, for example, IP address, net mask, default gateway, and domain name system (DNS) of the electronic information board 2.

The setting-file output unit 49b stores the various setting information of the electronic information board 2 in the USB memory 5 as a setting-file. Further, to secure the data security, the user cannot view the contents of the setting-file.

The setting-file input unit 49a reads out the setting-file from the USB memory 5, and outputs the contents of the setting-file to the setting manager 48. With employing this configuration, the various setting information can be applied as various settings of the electronic information board 2.

The connection address input unit 50 reads out a connection partner list, which is a list of IP addresses of connection partners used for the remote-location sharing process, from the USB memory 5 (e.g., CVS-format electronic files), and stores the connection partner list in the connection partner management table 440.

The connection partner management table 440 stores IP addresses of each one of the electronic information boards 2. When one of the electronic information boards 2 is used as the participant apparatus, which participates the already-started remote-location sharing process as the later participating apparatus, the user of the participant apparatus can select the IP address of the electronic information board 2 used as the host apparatus, which has started the remote-location sharing process, without inputting the IP address of the host apparatus manually, in which a manual input of the IP address of the electronic information board 2 used as the host apparatus can be omitted.

FIG. 27 illustrates an example of the connection partner management table 440. The connection partner management table 440 stores names and IP addresses of each one of the electronic information boards 2 that can be used as the host apparatus by co-relating the names and IP addresses of each one of the electronic information boards 2. In an example of FIG. 27, places where the electronic information board are disposed are used as the names of the electronic information boards.

Further, instead of using the connection partner management table 44, the user of the participant apparatus can input the IP address of the host apparatus by using the electronic pointer 4, in which the user of the participant apparatus asks the IP address of the host apparatus to a user of the host apparatus by a telephone call and/or electronic mail.

A description is given of capabilities of the (c)-communication controller 60. The (c)-communication controller 60 of one electronic information board controls communication with other electronic information board via the communication network 9, and communication with a (s)-communication controller 70 of the server unit 90 of the same electronic information board. As illustrated in FIG. 28, the (c)-communication controller 60 includes, for example, a remote-start processing unit 61, a remote-participation processing unit 62, a (c)-remote-image transmitter 63, a (c)-remote-image receiver 64, a (c)-remote-operation transmitter 65, a (c)-remote-operation receiver 66, and a (c)-participation location management table 610, in which (c) indicates a unit used in the client unit 20.

The remote-start processing unit 61 requests the server unit 90 of the same electronic information board 2 to start a new remote-location sharing process, and receives a response result to the start request from the server unit 90. Further, before transmitting the start request, the remote-start processing unit 61 refers to the remote license management table 310 to check whether the license information (e.g., product ID, license ID, expiration date of electronic information board 2) is managed. If the license information is managed, the remote-start processing unit 61 can issue the start request of the remote-location sharing process, but if the license information is not managed, the remote-start processing unit 61 cannot issue the start request of the remote-location sharing process.

When one electronic information board is used as the host apparatus, the (c)-participation location management table 610 of the host apparatus is used for managing one or more electronic information boards currently participating the remote-location sharing process as the participant apparatus. FIG. 29 illustrates an example of the (c)-participation location management table 610. The (c)-participation location management table 610 stores names and IP addresses of each one of the electronic information boards 2 that can be used as the participant apparatuses by co-relating the names and IP addresses of each one of the electronic information boards 2. In an example of FIG. 29, places where the electronic information boards are disposed are used as the names of the electronic information board.

The remote-participation processing unit 62 of the participant apparatus requests a participation of the remote-location sharing process to a remote-connection request receiving unit 71 in the server unit 90 in the host apparatus, which is the electronic information board 2 that has started or initiated the remote-location sharing process, via the communication network 9. The remote-participation processing unit 62 of the participant apparatus receives a response result to the participation request from the server unit 90 in the host apparatus. Further, before transmitting the participation request, the remote-participation processing unit 62 of the participant apparatus refers the remote license management table 310.

Further, when the remote-participation processing unit 62 of the participant apparatus is to participate the already-stared remote-location sharing process, the remote-participation processing unit 62 of the participant apparatus acquires the IP address of the host apparatus by referring to the connection partner management table 440. Further, instead of referring the connection partner management table 440 by using the remote-participation processing unit 62, the user of the participant apparatus can manually input the IP address of the host apparatus by using the electronic pointer 4, in which the user of the participant apparatus may ask the IP address of the host apparatus to a user of the host apparatus by a telephone call and/or electronic mail.

The (c)-remote-image transmitter 63 transmits the PC-output image received from the image data acquiring unit 31 to a (s)-remote-image receiver 73 of the server unit 90.

The (c)-remote-image receiver 64 receives the data of the PC-output image of other electronic information board 2 from the (s)-remote-image transmitter 74 in the server unit 90, and outputs the data of the PC-output image to the display-superimposing unit 36. With employing this configuration, the remote-location sharing process can be performed.

The (c)-remote-operation transmitter 65 transmits the operation data required for the remote-location sharing process to the (s)-remote-operation receiver 75 of the server unit 90. The operation data includes, for example, data of adding a stroke image, deleting a stroke image, editing a stroke image (expansion, reduction, moving), copying of a stroke image, cutting of a stroke image, pasting of a stroke image, storing of page data, generation of page data, duplication of page data, deleting of page data, and switching of displayed page.

The (c)-remote-operation receiver 66 receives the operation data input at other electronic information board 2 from a (s)-remote-operation transmitter 76 in the server unit 90, and outputs the operation data to the image processing unit 30. With employing this configuration, the remote-location sharing process can be performed.

A description is given of capabilities of the server unit 90. As illustrated in FIG. 28, the server unit 90 includes a (s)-communication controller 70 and a data manager 80.

A description is given of capabilities of the (s)-communication controller 70. The (s)-communication controller 70 controls (1) communication with the (c)-communication controller 60 of the client unit 20 of same the electronic information board 2, and (2) communication with the (c)-communication controller 60 of the client unit 20 of other electronic information board 2 via the communication network 9.

The (s)-communication controller 70 includes, for example, a remote-connection request receiving unit 71, a remote-connection result transmitter 72, a (s)-remote-image receiver 73, a (s)-remote-image transmitter 74, a (s)-remote-operation receiver 75, and a (s)-remote-operation transmitter 76, in which (s) indicates a unit used in the server unit 90.

The remote-connection request receiving unit 71 receives a start request of the remote-location sharing process from the remote-start processing unit 61, and receives a participation request to the remote-location sharing process from the remote-participation processing unit 62 of other electronic information board 2 via the communication network 9.

The remote-connection result transmitter 72 transmits a response result to the start request of the remote-location sharing process to the remote-start processing unit 61. The remote-connection result transmitter 72 transmits a response result to the participation request to the remote-location sharing process to the remote-participation processing unit 62 of other the electronic information board 2 via the communication network 9.

The (s)-remote-image receiver 73 receives the data of the PC-output image from the (c)-remote-image transmitter 63, and transmits the data of the PC-output image to a remote-image processing unit 82. The (s)-remote-image transmitter 74 receives the data of the PC-output image from a remote-image processing unit 82, and transmits the data of the PC-output image to the (c)-remote-image receiver 64.

The (s)-remote-operation receiver 75 receives the operation data from the (c)-remote-operation transmitter 65, and transmits the operation data to a remote-operation processing unit 83. When the (s)-remote-operation transmitter 76 receives the operation data from a remote-operation processing unit 83, the (s)-remote-operation transmitter 76 transmits the operation data to the (c)-remote-operation receiver 66.

A description is given of capabilities of the data manager 80. As illustrated in FIG. 28 the data manager 80 includes, for example, a remote-connection processing unit 81, a remote-image processing unit 82, a remote-operation processing unit 83, an operation synthesizing unit 84, a (s)-page processing unit 85, a pass code manager 810, a (s)-participation location management table 820, an image data storage 830, an operation data storage 840, and a (s)-page data storage 850, in which (s) indicates a unit used in the server unit 90.

The remote-connection processing unit 81 performs the start and end of the remote-location sharing process. Further, the remote-connection processing unit 81 checks whether the effective license is included and whether the license is within the expiration date based on the license information that the remote-connection request receiving unit 71 receives from the remote-start processing unit 61 with the start request of the remote-location sharing process, or based on the license information that the remote-connection request receiving unit 71 receives from the remote-participation processing unit 62 with the participation request to the remote-location sharing process.

Further, the remote-connection processing unit 81 checks whether the participation number exceeds the maximum participation-allowable number, set in advance when the participation request to the remote-location sharing process is received from other electronic information board 2.

The remote-connection processing unit 81 rejects the participation to the remote-location sharing process if the effective license is not included or the participation request exceeds the maximum participation-allowable number.

Further, the remote-connection processing unit 81 determines whether a pass code transmitted from other electronic information board 2 with the participation request to the remote-location sharing process matches a pass code managed by the pass code manager 810. The remote-connection processing unit 81 allows the participation to the remote-location sharing process when the pass codes match.

The pass code can be issued by the remote-connection processing unit 81 when a new remote-location sharing process is to be started, and managed by the pass code manager 810. The user of the participant apparatus that is to participate the remote-location sharing process can acquire the pass code from the user of the host apparatus by a telephone call and/or electronic mail or the like. When the user of the participant apparatus inputs the acquired pass code by using the electronic pointer 4, the user of the participant apparatus can request the participation to the remote-location sharing process. Further, if the operability of user is set with a higher priority over the security concern, the remote-connection processing unit 81 checks the license status alone without checking the pass code.

When the electronic information board 2 is used as the host apparatus, the remote-connection processing unit 81 of the host apparatus stores remote-location information, included in the participation request transmitted from the remote-participation processing unit 62 of the participant apparatus via the communication network 9, in the (s)-participation location management table 820. The remote-location information includes information of location where each user participate a remote conference.

Further, the remote-connection processing unit 81 reads out the remote-location information stored in the (s)-participation location management table 820, and transmits the remote-location information to the remote-connection result transmitter 72.

The remote-connection result transmitter 72 transmits the remote-location information to the remote-start processing unit 61 in the client unit 20 of the same host apparatus. Then, the remote-start processing unit 61 stores the received remote-location information in the (c)-participation location management table 610. With employing this configuration, the host apparatus manages the remote-location information at both of the client unit 20 and the server unit 90.

When the remote-image processing unit 82 of the electronic information board 2 used as the host apparatus receives the data of the PC-output image from the electronic information boards participating in the remote-location sharing process (including both of the host apparatus and the participant apparatus), stores the data of the PC-output image in the image data storage 830, and determines a display order of the image data to be used for the remote-location sharing process based on a time order that the server unit 90 of the electronic information board 2 used as the host apparatus receives the image data from rom the electronic information boards participating in the remote-location sharing process.

Further, the remote-image processing unit 82 transmits the image data with the above determined display order to the client unit 20 of all of the electronic information boards participating the remote-location sharing process (including the client unit 20 of the electronic information board 2 used as the host apparatus) via the (s)-remote-image transmitter 74 in the (s)-communication controller 70 by referring the (s)-participation location management table 820.

When the remote-operation processing unit 83 of the electronic information board 2 used as the host apparatus receives the operation data from the electronic information boards participating the remote-location sharing process (including both of the host apparatus and the participant apparatus), and the remote-operation processing unit 83 determines a display order of the image data to be used for the remote-location sharing process based on a time order that the server unit 90 of the electronic information board 2 used as the host apparatus receives the operation data from the electronic information boards participating the remote-location sharing process.

The operation data is same as the previously described operation data. Further, the remote-operation processing unit 83 transmits the operation data to the client unit 20 of all of the electronic information boards 2 participating the remote-location sharing process (including both of the host apparatus and the participant apparatus) by referring the (s)-participation location management table 820.

The operation synthesizing unit 84 synthesizes the operation data of each of the electronic information boards, output from the remote-operation processing unit 83, and stores the operation data as a synthesized result in the operation data storage 840, and returns the operation data to the remote-operation processing unit 83. The operation data returned to the remote-operation processing unit 83 is transmitted to the client unit 20 of the host apparatus and the participant apparatus via the (s)-remote-operation transmitter 76. With employing this configuration, the image based on the same operation data can be displayed at each of the electronic information boards.

FIG. 30 illustrates an example of the operation data. The operation data includes, for example, SEQ (sequence), operation name of operation data, IP address of electronic information board 2 used as a sender apparatus of operation data, the port number of the client unit or the server unit of the electronic information board 2 used as the sender apparatus, the IP address of the electronic information board 2 used as a transmission destination of the operation data, the port number of the client unit or the server unit of the electronic information board 2 used as the transmission destination, operation type of operation data, operation target of operation data, and data indicating operation contents as co-related data.

The operation name includes, for example, ADD, UPDATE, DELETE, COPY, PASTE, and CUT. ADD means that a new stroke image is drawn. UPDATE means that an already-drawn stroke image is edited. DELETE means that an already-drawn stroke image is deleted. COPY means that an already-drawn stroke image is copied. PASTE means that a stored stroke image is pasted. CUT means that an already-drawn stroke image is cut. In COPY and CUT, a selected stroke image data is stored.

For example, operation data SEQ1 indicates that a stroke image is drawn at the client unit (port number of "50001") of an electronic information board used as the host apparatus (IP address of "192.0.0.1"), and operation data is transmitted to the server unit (port number of "50000") of the same electronic information board used as the host apparatus (IP address of "192.0.0.1"), in which the operation name is "ADD," the operation type is "STROKE," the operation target is "page data having ID of p005," and data indicating the operation contents is "stroke data."

Further, operation data SEQ2 indicates that operation data is transmitted from the server unit (port number of "50000") of the electronic information board used as the host apparatus (IP address of "192.0.0.1") to the client unit (port number of "50001") of another electronic information board used as the participant apparatus (IP address of "192.0.0.2"), in which the operation name in which the operation name is "ADD," the operation type is "STROKE," the operation target is "page data having ID of p005," and data indicating the operation contents is "stroke data."

Since the operation synthesizing unit 84 synthesizes the operation data with the input sequence order, the stroke image can be displayed on the display 3 of all of the electronic information boards participating the remote-location sharing process with a stroke inputting sequence order input by users of each of the electronic information boards if the communication network 9 is not congested.

The (s)-page processing unit 85 has similar capabilities of the (c)-page processing unit 37 in the image processing unit 30 of the client unit 20, and stores the page data in the (s)-page data storage 850. Further, the (s)-page data storage 850 has the similar capabilities of the (c)-page data storage 300 in the image processing unit 30.

A description is given of operations at each of the electronic information boards in the image processing system 1 when the remote-location sharing process is performed among the plurality of the electronic information boards with reference to FIGS. 31 to 34.

Hereinafter, it is assumed that the image processing system 1 includes three electronic information boards, in which a first electronic information board 2a is used as the host apparatus of the remote-location sharing process, and a second electronic information board 2b and a third electronic information board 2c are used as the participant apparatuses that participate the remote-location sharing process initiated by the first electronic information board 2a.

The first electronic information board 2a includes the first display 3a, the second electronic information board 2b includes the second display 3b, and the third electronic information board 2c includes the third display 3c. Further, the first note PC 6a is communicably connected or coupled to the first electronic information board 2a, the second note PC 6b is communicably connected or coupled to the second electronic information board 2b, and the third note PC 6c is communicably connected or coupled to the third electronic information board 2c. Further, the first electronic pointer 4a is used for the first electronic information board 2a, the second electronic pointer 4b is used for the second electronic information board 2b, and the third electronic pointer 4c is used for the third electronic information board 2c.

(1) Processing of Participation

Figure 31:
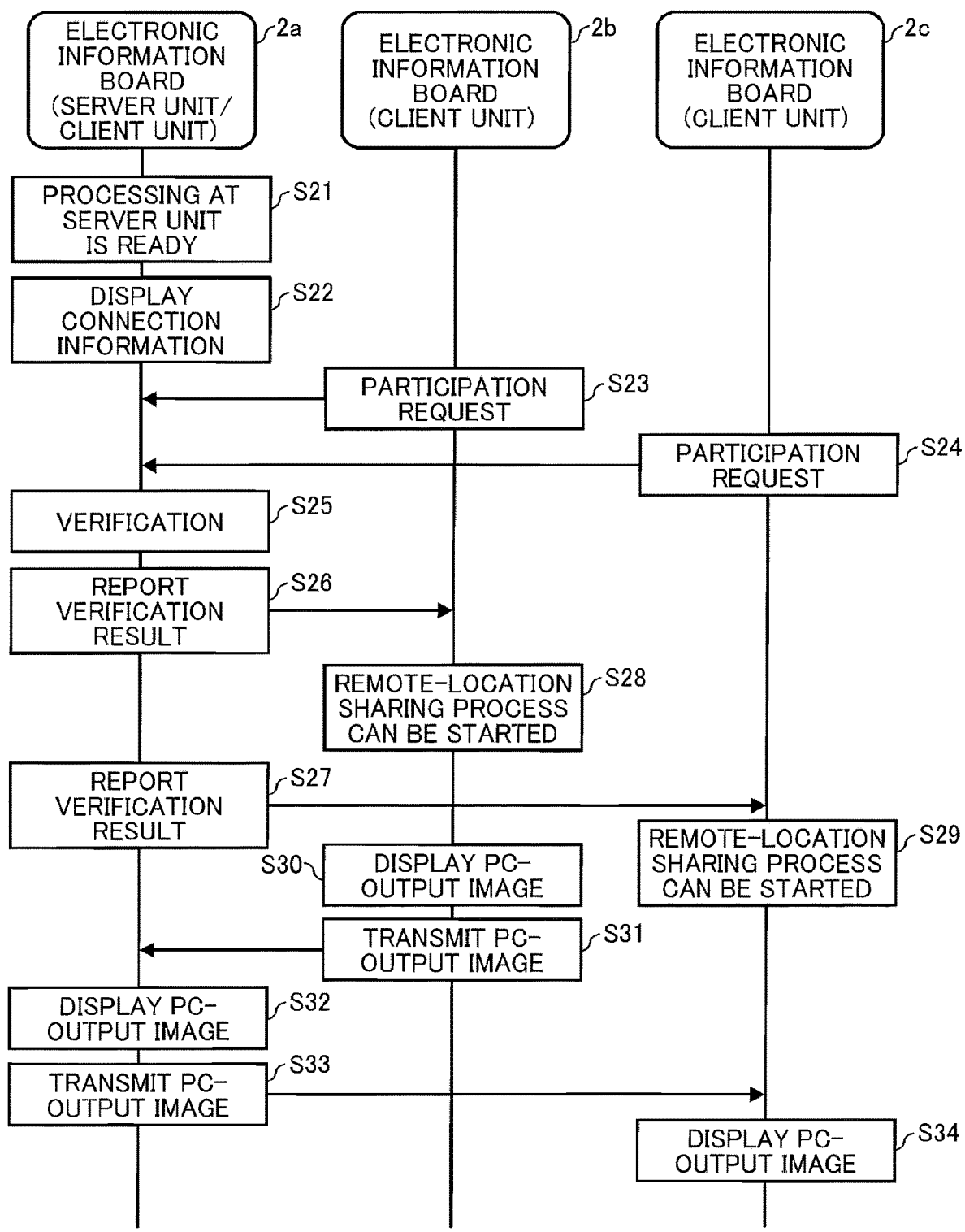
FIG. 31, FIG. 32, FIG. 33 and FIG. 34 are sequential charts of a remote-location sharing process.

A description is given of processing when the second electronic information board 2b and the third electronic information boards 2c participate the remote-location sharing process with reference to FIG. 31. It is assumed that a power is supplied to each of the first electronic information board 2a, the second electronic information board 2b, and the third electronic information board 2c by respective first, second and third users A, B and C, and the client unit 20 of each of the first electronic information board 2a, the second electronic information board 2b, and the third electronic information board 2c is already activated.

When the first user A of the first electronic information board 2a performs an operation to activate the server unit 90 by using the electronic pointer 4, the remote-start processing unit 61 in the client unit 20 outputs an instruction to activate the server unit 90 to the remote-connection request receiving unit 71 in the server unit 90 of the first electronic information board 2a. With employing this configuration, various processing can be ready for starting at the server unit 90 of the first electronic information board 2a (step S21).

Then, the UI image generation unit 33 in the client unit 20 of the first electronic information board 2a generates connection information used for establishing a connection with the first electronic information board 2a, and outputs the connection information to the display-superimposing unit 36. The image superimposing unit 28 displays the connection information received via the display-superimposing unit 36 on the first display 3a (step S22). Then, the connection information may be informed from the first user A of the first electronic information board 2a to the second user B of the second electronic information board 2b and the third user C of the third electronic information board 2c by a telephone call and/or electronic mail.

The connection information includes the IP address of the host apparatus, and a pass code generated for the current remote-location sharing process.

The pass code stored in the pass code manager 810 is read out by the remote-connection processing unit 81, and transmitted to the remote-connection result transmitter 72, and then the remote-start processing unit 61. Further, the pass code is transmitted from the (c)-communication controller 60 having the remote-start processing unit 61 to the image processing unit 30, and then input to the UI image generation unit 33.

If the connection partner management table 440 is disposed, the participant apparatus can perform the participation request even if the connection information does not include the IP address of the host apparatus.

Then, when the second user B inputs the connection information to the second electronic information board 2b by using the second electronic pointer 4b, the remote-participation processing unit 62 in the client unit 20 of the second electronic information board 2b transmits the pass code to the (s)-communication controller 70 in the server unit 90 of the first electronic information board 2a via the communication network 9 based on the IP address included in the connection information to perform a participation request (step S23).

Similarly, when the third user C inputs the connection information to the third electronic information board 2c by using the third electronic pointer 4c, the remote-participation processing unit 62 in the client unit 20 of the third electronic information board 2c transmits the pass code to the (s)-communication controller 70 in the server unit 90 of the first electronic information board 2a via the communication network 9 based on the IP address included in the connection information to perform a participation request (step S24).

At the first electronic information board 2a, when the remote-connection request receiving unit 71 in the (s)-communication controller 70 receives the participation request including the pass code from each of the second electronic information board 2b and the third electronic information board 2c, the remote-connection request receiving unit 71 outputs the pass code to the remote-connection processing unit 81.

Then, at the first electronic information board 2a, the remote-connection processing unit 81 verifies the pass code received from each of the second electronic information board 2b and the third electronic information board 2c by using the pass code managed by the pass code manager 810 (step S25).

Then, at the first electronic information board 2a, the remote-connection result transmitter 72 reports a verification result to the client unit 20 of each of the second electronic information board 2b and the third electronic information board 2c (step S26 and S27).

If the second electronic information board 2b and the third electronic information board 2c are determined as the electronic information board having the authentic status at step S25, the communication of the remote-location sharing process is established between the first electronic information board 2a used as the host apparatus and the second electronic information board 2b and the third electronic information board 2c used as the participant apparatus, and the remote-participation processing unit 62 in the client unit 20 of each of the second electronic information board 2b and the third electronic information board 2c can start the remote-location sharing process with other electronic information boards (steps S28 and S29).

(2) Display of PC-Output Image

A description is given of processing of displaying a PC-output image in the remote-location sharing process with reference to FIG. 31. It is assumed that a PC-output image generated at the second electronic information board 2b is displayed on the first display 3a of the first electronic information board 2a, and the third display 3c of the third electronic information board 2c. Hereinafter, the PC-output image displayed on the second electronic information board 2b is simply referred to as "PC-output image (2b)."

At first, the second electronic information board 2b displays the PC-output image (2b) on the second display 3b (step S30). Specifically, the image data acquiring unit 31 of the second electronic information board 2b acquires the PC-output image (2b) from an output image of the second note PC 6b as one PC-output image. Then, the PC-output image (2b) is transmitted to the second display 3b via the display-superimposing unit 36 and the image superimposing unit 28, and displayed on the second display 3b.

Then, at the second electronic information board 2b, the image data acquiring unit 31 outputs the PC-output image (2b) data to the (c)-remote-image transmitter 63. Then, the (c)-remote-image transmitter 63 transmits the PC-output image (2b) data to the (s)-communication controller 70 of the first electronic information board 2a via the communication network 9 (step S31).

At the first electronic information board 2a, when the (s)-remote-image receiver 73 receives the PC-output image (2b) data from the second electronic information board 2b, the (s)-remote-image receiver 73 outputs the PC-output image (2b) data to the remote-image processing unit 82. Then, the remote-image processing unit 82 stores the PC-output image (2b) data in the image data storage 830.

Then, the first electronic information board 2a displays the PC-output image (2b), received from the second electronic information board 2b, on the first display 3a (step S32).

Specifically, at the first electronic information board 2a, the remote-image processing unit 82 outputs the PC-output image (2b) data, received from the second electronic information board 2b by the (s)-remote-image receiver 73, to the (s)-remote-image transmitter 74. Then, the (s)-remote-image transmitter 74 outputs the PC-output image (2b) data to the (c)-remote-image receiver 64 in the client unit 20 of the first electronic information board 2a.

Further, at the first electronic information board 2a, the (c)-remote-image receiver 64 outputs the PC-output image (2b) data, received from the second electronic information board 2b, to the display-superimposing unit 36. The display-superimposing unit 36 outputs the PC-output image (2b) data to the image superimposing unit 28. The image superimposing unit 28 outputs the PC-output image (2b) data to the first display 3a. With employing this configuration, the first display 3a displays the PC-output image (2b) received from the second electronic information board 2b.

Then, at the first electronic information board 2a, the (s)-remote-image transmitter 74 in the server unit 90 transmits the PC-output image (2b), received from the second electronic information board 2b, to the (c)-communication controller 60 of the third electronic information board 2c via the communication network 9 (step S33).

With employing this configuration, the (c)-remote-image receiver 64 of the third electronic information board 2c receives the PC-output image (2b) data generated at the second electronic information board 2b.

Then, the third electronic information board 2c displays the PC-output image (2b) generated at the second electronic information board 2b on the third display 3c (step S34).

Specifically, at the third electronic information board 2c, when the (c)-remote-image receiver 64 receives the PC-output image (2b) data from the first electronic information board 2a, the (c)-remote-image receiver 64 outputs the PC-output image (2b) data to the display-superimposing unit 36 of the third electronic information board 2c. The display-superimposing unit 36 outputs the PC-output image (2b) data to the image superimposing unit 28.

The image superimposing unit 28 outputs the PC-output image (2b) data to the third display 3c. With employing this configuration, the PC-output image (2b) generated at the second electronic information board 2b is displayed on the third display 3c of the third electronic information board 2c.

If the data of the UI image and the data of stroke image are also input to the image superimposing unit 28 with the data of the PC-output image, the display-superimposing unit 36 generates an image superimposing the UI image, the stroke image and the PC-output image as a superimposed image, and the image superimposing unit 28 outputs the superimposed image data to the third display 3c.

Further, if the teleconference terminal 7 is transmitting data of a teleconference image (hereinafter referred to as "conference image data") to the image superimposing unit 28, the image superimposing unit 28 superimposes the conference image data on the superimposed image as picture in picture, and outputs to the third display 3c.

(3) Display of Superimposed Image

Figure 32:
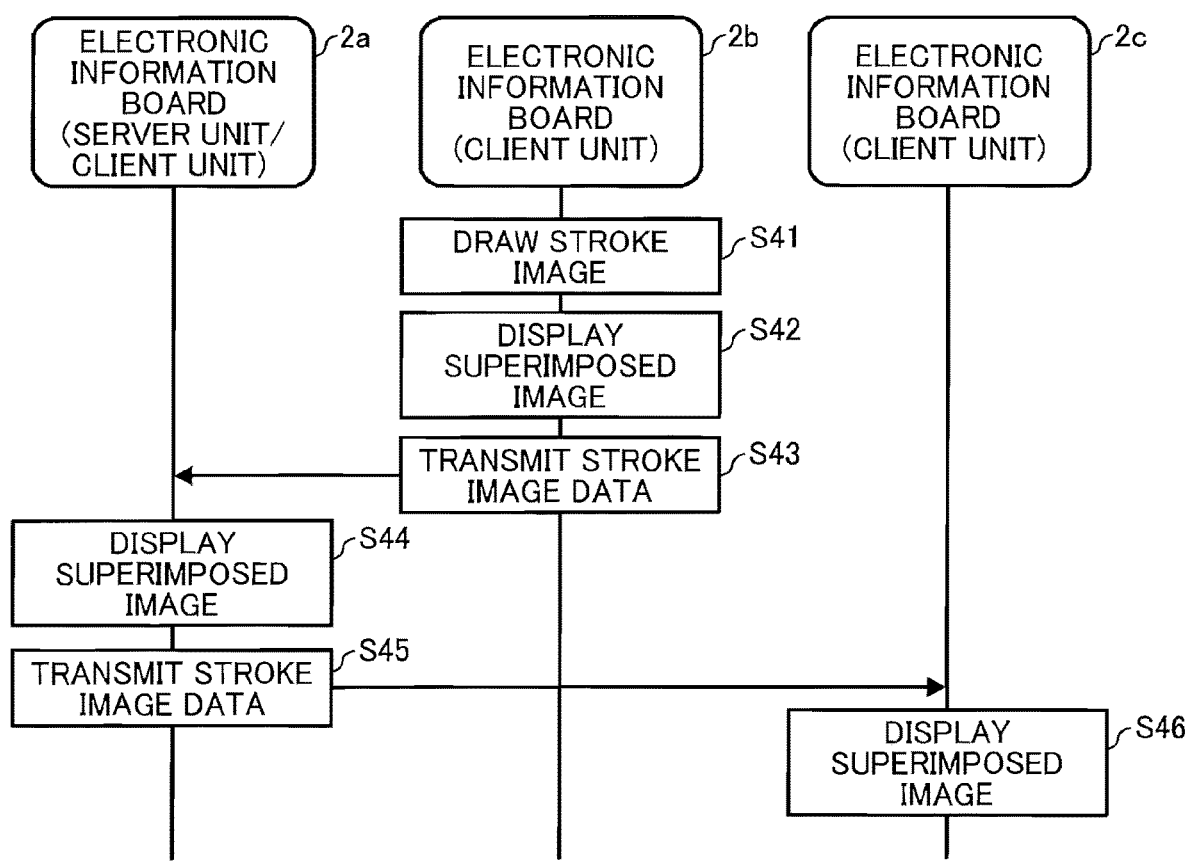

A description is given of processing of displaying the superimposed image in the remote-location sharing process with reference to FIG. 32. It is assumed that a superimposed image generated at the second electronic information board 2b is displayed on the first display 3a of the first electronic information board 2*a*, and the third display 3*c* of the third electronic information board 2*c*.

At first, at the second electronic information board 2*b*, the second user B draws a stroke image at the second electronic information board 2*b* by using the second electronic pointer 4*b* (step S41). Hereinafter, the stroke image drawn at the second electronic information board 2*b* is simply referred to as "stroke image (2*b*)."

Then, at the second electronic information board 2*b*, the display-superimposing unit 36 superimposes the stroke image (2*b*) to the UI image and the PC-output image, with which the UI image, the stroke image (2*b*) and the PC-output image are superimposed as a superimposed image. The image superimposing unit 28 displays the superimposed image on the second display 3*b* of the second electronic information board 2*b* (step S42).

Specifically, at the second electronic information board 2*b*, the stroke processing unit 32 receives the stroke image (2*b*) data from the event identification unit 25, and transmits the stroke image (2*b*) data to the display-superimposing unit 36. With employing this configuration, the display-superimposing unit 36 can superimpose the stroke image (2*b*) to the UI image and the PC-output image, and the image superimposing unit 28 can display the superimposed image on the second display 3*b* of the second electronic information board 2*b*.

Then, at the second electronic information board 2*b*, the image processing unit 30 outputs the stroke image (2*b*) data to the (c)-remote-operation transmitter 65. The (c)-remote-operation transmitter 65 transmits the stroke image (2*b*) data to the (s)-communication controller 70 of the first electronic information board 2*a* via the communication network 9 (step S43).

At the first electronic information board 2*a*, when the (s)-remote-operation receiver 75 receives the stroke image (2*b*) data from the second electronic information board 2*b*, the (s)-remote-operation receiver 75 outputs the stroke image (2*b*) data to the remote-operation processing unit 83. The remote-operation processing unit 83 outputs the stroke image (2*b*) data to the operation synthesizing unit 84.

With employing this configuration, the stroke image (2*b*) data drawn at the second electronic information board 2*b* is transmitted to the remote-operation processing unit 83 of the first electronic information board 2*a* used as the host apparatus each time the stroke image (2*b*) is drawn, in which the stroke image (2*b*) are sequentially transmitted. The stroke data ID is an identification (ID) to identify the concerned stroke data. The stroke image (2*b*) data includes data identified by each of the stroke data ID. Therefore, for example, when the second user B draws an alphabet "T" by using the second electronic pointer 4*b*, the stroke image (2*b*) data identified two stroke data IDs are sequentially transmitted the because alphabet "T" is drawn by two one strokes.

Then, the first electronic information board 2*a* displays the superimposed image including the stroke image (2*b*) data and transmitted from the second electronic information board 2*b* on the first display 3*a* (step S44).

Specifically, at the first electronic information board 2*a*, the operation synthesizing unit 84 synthesizes the plurality of the stroke image (2*b*) data sequentially transmitted via the remote-operation processing unit 83, stores the synthesized stroke image in the operation data storage 840, and returns the synthesized stroke image to the remote-operation processing unit 83.

With employing this configuration, the remote-operation processing unit 83 outputs the synthesized stroke image (2*b*) data output from the operation synthesizing unit 84 to the (s)-remote-operation transmitter 76. The (s)-remote-operation transmitter 76 outputs the synthesized stroke image (2*b*) data to the (c)-remote-operation receiver 66 in the client unit 20 of the same first electronic information board 2*a*.

The (c)-remote-operation receiver 66 outputs the synthesized stroke image (2*b*) data to the display-superimposing unit 36 in the image processing unit 30. Then, the display-superimposing unit 36 superimposes the synthesized stroke image (2*b*) to the UI image and the PC-output image. Then, the image superimposing unit 28 outputs the superimposed image, superimposed at the display-superimposing unit 36, to the first display 3*a*. The superimposed image output to the first display 3*a* is same as the superimposed image displayed on the second display 3*b*.

Then, the (s)-remote-operation transmitter 76 in the server unit 90 of the first electronic information board 2*a* transmits the synthesized stroke image (2*b*) data to the (c)-communication controller 60 of the third electronic information board 2*c* via the communication network 9 (step S45).

With employing this configuration, the (c)-remote-operation receiver 66 of the third electronic information board 2*c* receives the synthesized stroke image (2*b*) data.

Then, the third electronic information board 2*c* displays the superimposed image on the third display 3*c* (step S46).

Specifically, at the third electronic information board 2*c*, when the (c)-remote-operation receiver 66 receives the synthesized stroke image (2*b*) data, the (c)-remote-operation receiver 66 outputs the stroke image (2*b*) data to the image processing unit 30. At the image processing unit 30, the display-superimposing unit 36 superimposes the UI image data, the PC-output image data and, and the stroke image (2*b*) data, and outputs the superimposed image data to the image superimposing unit 28.

The image superimposing unit 28 outputs the superimposed image data to the third display 3*c*. With employing this configuration, the third display 3*c* can display the superimposed image. The superimposed image displayed on the third display 3*c* is same as the superimposed image displayed on the first display 3*a* and the second display 3*b*.

In the above described processing, the PC-output image is displayed on the display 3. Instead of the PC-output image, the background image can be displayed on the display 3. Further, instead of using the PC-output image and the background image as exclusively used images, both of the PC-output image and the background image can be displayed on the display 3 at the same time.

(4) Copying and Pasting of Stroke Image

Figure 33:
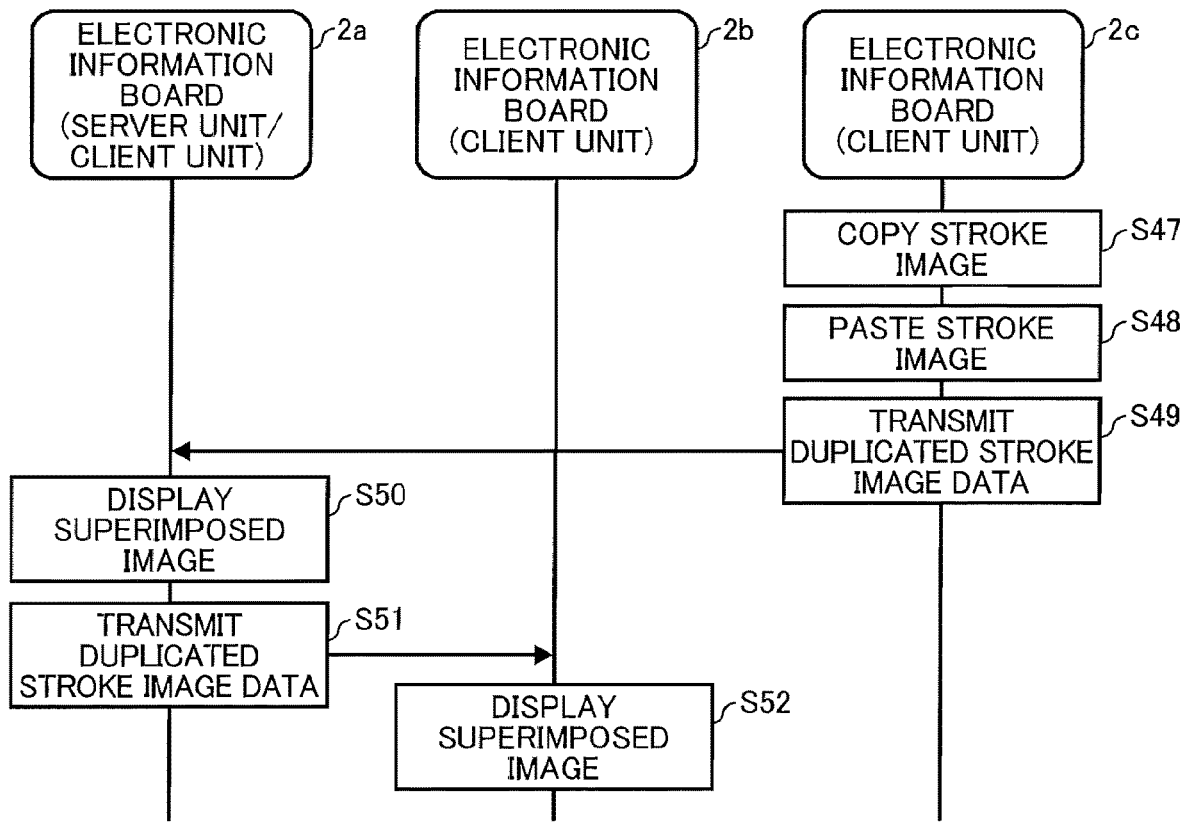

A description is given of processing of copying and pasting of the stroke image in the remote-location sharing process with reference to FIG. 33. It is assumed that the copying and pasting is performed to the stroke image displayed on the third display 3*c* of the third electronic information board 2*c*.

At the third electronic information board 2*c*, the third user C instructs a copying of the stroke image displayed on the third display 3*c* of the third electronic information board 2*c* (step S47).

At the third electronic information board 2*c*, the third user C paste the stroke image (step S48). With employing this configuration, at the third electronic information board 2*c*, a new stroke image, which is a duplicated stroke image, is added to a layer of the stroke image. Hereinafter, the new stroke image (i.e., copied and pasted stroke image) is simply referred to as "stroke image C&P."

Then, at the third electronic information board 2*c*, the image processing unit 30 outputs the stroke image C&P data to the (c)-remote-operation transmitter 65. The (c)-remoteoperation transmitter 65 transmits the stroke image C&P data to the (s)-communication controller 70 of the first electronic information board 2a via the communication network 9 (step S49).

Then, the first electronic information board 2a displays the superimposed image including the stroke image C&P data transmitted from the third electronic information board 2c on the first display 3a (step S50).

Then, the (s)-communication controller 70 in the server unit 90 of the first electronic information board 2a transmits the stroke image C&P data to the (c)-communication controller 60 of the second electronic information board 2b via the communication network 9 (step S51).

With employing this configuration, the (c)-remote-operation receiver 66 of the second electronic information board 2b receives the stroke image C&P data.

Then, the second electronic information board 2b displays the superimposed image including the stroke image C&P data, transmitted from the first electronic information board 2a, on the second display 3b (step S52).

(5) End of Participation

Figure 34:
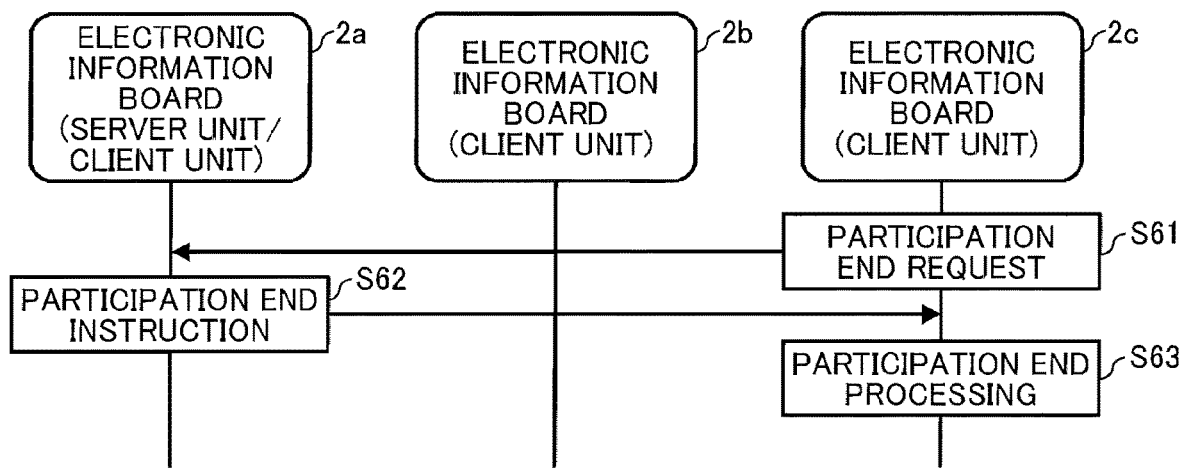

A description is given of processing ending of participation of the participant apparatus to the remote-location sharing process with reference to FIG. 34. It is assumed that the third electronic information board 2c ends the participation.

At first, at the third electronic information board 2c, when the third user C inputs a participation end request by using the electronic pointer 4 to the third electronic information board 2c, the remote-participation processing unit 62 transmits the participation end request to the (s)-communication controller 70 in the server unit 90 of the first electronic information board 2a (step S61).

At the first electronic information board 2a, when the remote-connection request receiving unit 71 of the (s)-communication controller 70 receives the participation end request from the third electronic information board 2c, the remote-connection request receiving unit 71 outputs the participation end request and the IP address of the third electronic information board 2c to the remote-connection processing unit 81.

Based on the IP address transmitted from the remote-connection request receiving unit 71, the remote-connection processing unit 81 deletes the IP address of the third electronic information board 2c that has transmitted the participation end request and the location name where the third electronic information board 2c is set from the (s)-participation location management table 820, and the remote-connection processing unit 81 outputs a report of deleting the IP address and the location name of the third electronic information board 2c to the remote-connection result transmitter 72.

Then, the (s)-communication controller 70 of the first electronic information board 2a instructs the end of participation to the (c)-communication controller 60 in the client unit 20 of the third electronic information board 2c via the communication network 9 (step S62).

At the third electronic information board 2c, when the remote-participation processing unit 62 of the (c)-communication controller 60 receives the participation end instruction from the electronic information board 2a, the remote-participation processing unit 62 disconnects the communication to the remote-location sharing process, and performs the participation end processing. With employing this configuration, the participation of the third electronic information board 2c to the remote-location sharing process is ended (step S63).

The above described image processing system 1 includes, for example, the plurality of electronic information boards that can be communicably connected or coupled for communicating data via the communication network 9. Further, the note PC 6 and the teleconference terminal 7 can be communicably connected or coupled to each of the electronic information boards.

The above described electronic information board 2 includes, for example, the display 3, the CPU 101, the ROM 102, the RAM 103, the SSD 104, the network controller 105, the external memory controller 106, the capture device 111, the GPU 112, the display controller 113, the sensor controller 114, the contact sensor 115, and the electronic pointer controller 116.

The above described electronic information board 2 includes, for example, the client unit 20 and the server unit 90. When the electronic information board 2 is used as the "host apparatus," both of the client unit 20 and the server unit 90 are activated in the second electronic information board 2 by contrast, when the electronic information board 2 is used as the "participant apparatus," the client unit 20 is activated but the server unit 90 is not activated in the electronic information board 2.

The client unit 20 includes, for example, the image acquiring unit 21, the coordinate detection unit 22, the automatic adjustment unit 23, the contact detection unit 24, the event identification unit 25, the operation processing unit 26, the gesture processing unit 27, the image superimposing unit 28, the image processing unit 30, and the (c)-communication controller 60.

The coordinate detection unit 22 detects coordinates of the contact position or point when the electronic pointer 4 or the user hand H contacts the display 3. The contact detection unit 24 detects whether the electronic pointer 4 contacts or not.

The event identification unit 25 determines or identifies whether the event is any one of the "stroke drawing," "UI operation" and "gesture operation" based on the coordinates of the position detected by the coordinate detection unit 22 and the detection result of the contact detection unit 24. If the event is the "stroke drawing," the event identification unit 25 outputs the event information to the image processing unit 30. If the event is the "UI operation," the event identification unit 25 outputs the event information to the operation processing unit 26. If the event is the "gesture operation," the event identification unit 25 outputs the event information to the gesture processing unit 27.

A user can perform the copying and cutting operation to any stroke image displayed on the display 3. When the copying operation is performed, the selected stroke image is stored and the stroke image remains on the display 3. By contrast, when the cutting operation is performed, the selected stroke image is stored while the stroke image is deleted from the display 3. Then, the stroke image stored by the copying or cutting operation can be displayed at any position on the display 3 by performing the pasting operation.

Therefore, among the stroke image displayed on the display 3, a duplication of the stroke image selected by the user can be generated by performing the copying or cutting operation, and then the duplication can be displayed on the display 3 by performing the pasting operation.

As to the above described electronic information board 2, the copying, cutting and pasting operations can be performed to an image displayed on the display 3, with which operability of the electronic information board 2 and the image processing system 1 can be enhanced.

Further, as to the above described electronic information board 2, information of the copying, cutting and pasting operations can be transmitted to other electronic information board via the communication network 9, with which the remote-location sharing process can be implemented or devised easily in the image processing system 1.

Further, as to the above described example embodiment, the communication network 9 can be a network including local area network (LAN), the Internet, and telephone communication line.

Further, as to the above described example embodiment, the electronic information board is used as an example of the image processing apparatuses, but not limited hereto. For example, a digital signage, a telestrator used for sports and weather forecast, and a remote image inspection apparatus can be used as examples of the image processing apparatuses the image processing apparatuses.

Further, as to the above described example embodiment, the setting-file, the backup file, and the address list are stored in the USB memory 5, but not limited hereto. For example, instead of the USB memory 5, the setting-file, the backup file, and the address list can be stored in other storage medium or carrier medium such as SD card, or the setting-file, the backup file, and the address list can be stored in the USB memory 5 and also other storage medium or carrier medium.

Further, as to the above described example embodiment, the note PC is used as an example of image output devices, but not limited hereto. For example, instead of the note PC, a desktop PC, a tablet PC, a personal digital assistance (PDA), a digital video camera, a digital camera, and a game machine can be used as the image output devices. The image output devices can be any terminal devices that can output image data.

Further, as to the above described example embodiment, various programs are stored in the ROM 102, but not limited hereto. For example, various programs can be stored in a storage medium or carrier medium such as CD and DVD, in which the electronic information board 2 includes a drive unit to read out various programs from the storage medium or carrier medium.

Further, as to the above described example embodiment, a part of the processing executed by the CPU101 using programs can be configured as a hardware.

As to the image processing apparatus of the above described example embodiments, operations such as copying, cutting and pasting operations can be performed to an image displayed on the display, with which operability of the image processing apparatus such as the electronic information board and the image processing system including the image processing apparatus can be enhanced.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above described image processing method performable in the image processing apparatus can be described as a computer-executable program, and the computer-executable program can be stored in a ROM or the like in the image processing apparatus and executed by the image processing apparatus. Further, the computer-executable program can be stored in a storage medium or a carrier such as compact disc-read only memory (CD-ROM), digital versatile disc-read only memory (DVD-ROM) or the like for distribution, or can be stored on a storage on a network and downloaded as required.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An electronic information board interactively communicable with another electronic information board via a network, the electronic information board comprising:
    a memory;
    a display; and
    circuitry configured to
        generate image data of a stroke image when a stroke is input to the display according to an operation of a user;
        store stroke data in the memory, the stroke data corresponding to the image data and based on the stroke input to the display according to the operation of the user;
        display the image data on the display;
        select the image data, displayed on the display, in response to another operation of the user;
        store, in response to the selection, the image data in the memory;
        display, on the display at a location of the another operation of the user and in response to the another operation of the user, a menu that presents options for processing of the image data, the options including a cut operation, a copy operation and a paste operation;
        cut the image data from the display and copy the stroke data from the memory in response to a third operation of the user that selects the cut operation from the menu;
        copy the stroke data from the memory in response to a fourth operation of the user that selects the copy operation from the menu;
        paste the image data on the display in response to a fifth operation of the user that selects the paste operation from the menu, the image data being pasted based on the stroke data;
        duplicate the image data stored in the memory to generate duplicated image data of the stroke image stored in the memory, the duplicated image data being generated based on the stroke data;
        in response to the duplication, (1) automatically display the duplicated image data on the display, and (2) automatically transmit, via the network, the duplicated image data to the another electronic information board; and
        receive, via the network, second image data of another stroke image from the another electronic information board.

2. The electronic information board of claim 1, wherein the circuitry is further configured to in response to copying the stroke data, store the copied stroke data in the memory, and maintain a display of the image data on the display.

3. The electronic information board of claim 1, wherein the circuitry is further configured to instruct the display to display the image data at a position on the display according to the operation of the user.

4. The electronic information board of claim 1, wherein the circuitry is further configured to duplicate the image data by copying the image data and pasting the image data, and then transmitting the duplicated image data after pasting the image data.

5. The electronic information board of claim 1, wherein the circuitry is further configured to transmit the duplicated image data to the another electronic information board, which functions as a server and which transmits the duplicated image data to a third electronic information board.

6. The electronic information board of claim 1, wherein the circuitry is further configured to
display a media image on the display,
generate an output image by superimposing the duplicated image data on the media image, and
replace display of the media image with display of the output image on the display.

7. The electronic information board of claim 6, wherein the circuitry is further configured to
generate a second output image by superimposing the second image data on the output image, and
replace display of the output image with display of the second output image on the display.

8. The electronic information board of claim 1, wherein the image data is associated with a stroke data identifier.

9. The electronic information board of claim 1, wherein the image data is displayed as a first layer on the display, and
the second image data is displayed as a second layer on the display.

10. A method of interactively communicating information between a first electronic information board and second electronic information board via a network, the method comprising:
generating image data of a stroke image when a stroke is input to a display of the first electronic information board according to an operation of a user on the first electronic information board;
storing stroke data in a memory of the first electronic information board, the stroke data corresponding to the image data and based on the stroke input to the display according to the operation of the user;
displaying the image data on the display;
selecting the image data, displayed on the display, in response to another operation of the user on the first electronic information board;
storing, in response to the selection, the image data in the memory;
displaying, on the display at a location of the another operation of the user and in response to the another operation of the user, a menu that presents options for processing of the image data, the options including a cut operation, a copy operation and a paste operation;
cutting the image data from the display and copy the stroke data from the memory in response to a third operation of the user that selects the cut operation from the menu;
copying the stroke data from the memory in response to a fourth operation of the user that selects the copy operation from the menu;
pasting the image data on the display in response to a fifth operation of the user that selects the paste operation from the menu, the image data being pasted based on the stroke data;
duplicating the image data stored in the memory to generate duplicated image data of the stroke image stored in the memory, the duplicated image data being generated based on the stroke data;
in response to the duplication, (1) automatically displaying the edited image data on the display, and (2) automatically transmitting, by the first electronic information board to the second electronic information board via the network, the duplicated image data of the stroke image; and
receiving, by the first electronic information board from the second electronic information board via the network, second image data of another stroke image.

11. The method of claim 10, further comprising:
displaying a media image on the display;
generating an output image by superimposing the duplicated image data on the media image; and
replacing display of the media image with display of the output image on the display.

12. The method of claim 11, further comprising:
generating a second output image by superimposing the second image data on the output image; and
replacing display of the output image with display of the second output image on the display.

13. The method of claim 10, wherein
the image data is displayed as a first layer on the display, and
the second image data is displayed as a second layer on the display.

14. The method of claim 10, wherein the image data is associated with a stroke data identifier.

15. The method of claim 10, further comprising:
instructing the display to display the image data of the stroke imago at a position on the display according to the operation of the user.

16. A non-transitory storage medium storing a program that, when executed by a computer, causes the computer to execute a method of interactively communicating information between a first electronic information board and second electronic information board via a network, the method comprising:
generating image data of a stroke image when a stroke is input to a display of the first electronic information board according to an operation of a user on the first electronic information board;
storing stroke data in a memory of the first electronic information board, the stroke data corresponding to the image data and based on the stroke input to the display according to the operation of the user;
displaying the image data on the display;
selecting the image data, displayed on the display, in response to another operation of the user on the first electronic information board;
storing, in response to the selection, the image data in the memory;
displaying, on the display at a location of the another operation of the user and in response to the another operation of the user, a menu that presents options for processing of the image data, the options including a cut operation, a copy operation and a paste operation;

cutting the image data from the display and copy the stroke data from the memory in response to a third operation of the user that selects the cut operation from the menu;

copying the stroke data from the memory in response to a fourth operation of the user that selects the copy operation from the menu;

pasting the image data on the display in response to a fifth operation of the user that selects the paste operation from the menu, the image data being pasted based on the stroke data;

duplicating the image data stored in the memory to generate duplicated image data of the stroke image stored in the memory, the duplicated image data being generated based on the stroke data;

in response to the duplication, (1) automatically displaying the edited image data on the display, and (2) automatically transmitting, by the first electronic information board to the second electronic information board via the network, the duplicated image data of the stroke image; and receiving, by the first electronic information board from the second electronic information board via the network, second image data of another stroke image.

17. The non-transitory storage medium of claim 16, wherein the method further comprises:

displaying a media image on the display;

generating an output image by superimposing the duplicated image data on the media image; and replacing display of the media image with display of the output image on the display.

18. The non-transitory storage medium of claim 17, wherein generating a second output image by superimposing the second image data on the output image; and replacing display of the output image with display of the second output image on the display.

19. The non-transitory storage medium of claim 16, wherein the image data is displayed as a first layer on the display, and the second image data is displayed as a second layer on the display.

20. The non-transitory storage medium of claim 16, wherein the image data is associated with a stroke data identifier.

* * * * *